(12) United States Patent
Nakagawa et al.

(10) Patent No.: US 7,070,139 B2
(45) Date of Patent: Jul. 4, 2006

(54) REEL UNIT FOR DUAL-BEARING REEL

(75) Inventors: Shouji Nakagawa, Sakai (JP); Akira Nago, Sakai (JP)

(73) Assignee: Shimano Inc., Osaka (JP)

(*) Notice: Subject to any disclaimer, the term of this patent is extended or adjusted under 35 U.S.C. 154(b) by 0 days.

(21) Appl. No.: 11/103,456

(22) Filed: Apr. 12, 2005

(65) Prior Publication Data

US 2005/0224617 A1 Oct. 13, 2005

(30) Foreign Application Priority Data

| Apr. 13, 2004 | (JP) | ............................. 2004-117788 |
| May 14, 2004 | (JP) | ............................. 2004-144826 |
| May 25, 2004 | (JP) | ............................. 2004-154246 |

(51) Int. Cl.
 *A01K 89/105* (2006.01)
(52) U.S. Cl. .................. 242/313; 242/314; 242/322
(58) Field of Classification Search .............. 254/310, 254/312–315, 318, 322
 See application file for complete search history.

(56) References Cited

U.S. PATENT DOCUMENTS 5,558,290 A * 9/1996 Sato ............................ 242/313
6,460,793 B1 * 10/2002 Hirayama et al. ........... 242/313
2005/0040269 A1 * 2/2005 Iwabuchi et al. ............ 242/311

FOREIGN PATENT DOCUMENTS

| JP | 2001-054342 A | 2/2001 |
| JP | 2001-145443 A | 5/2001 |

* cited by examiner

*Primary Examiner*—Kathy Matecki
*Assistant Examiner*—Evan H. Langdon
(74) *Attorney, Agent, or Firm*—Global IP Counselors

(57) ABSTRACT

The reel unit of a dual-bearing reel includes a frame, first and second side covers, an operating lever, and guard members. The frame has first and second side plates and a connection member. The first side cover, to which the handle is mounted, is mounted to the first side plate. The second side cover is mounted to the second side plate in an inclined manner such that a fore end of the second side cover is closer to the second side plate. The operating lever is provided on the second side plate protruding inward from the second side plate. The second side cover is locked in a closed state when the operation portion assumes a second position, while the operation portion allows the second side cover to be opened and closed relative to the second side plate when the operation portion assumes a first position.

20 Claims, 20 Drawing Sheets

REEL UNIT FOR DUAL-BEARING REEL

BACKGROUND OF THE INVENTION

1. Field of the Invention

The present invention relates to a reel unit. More specifically, and the present invention relates to a reel unit for a dual-bearing reel that has a handle disposed on one side surface and a spool disposed inside the dual-bearing reel unit.

2. Background Information

Generally, a dual-bearing reel includes a reel unit to be mounted on a fishing rod, a spool disposed inside the reel unit, and a handle provided on one side of the reel unit. The reel unit has a frame, and a pair of first and second side covers that cover both sides of the frame. The frame has a pair of first and second side plates, and a connection member that connects the first and second side plates. The first and second side covers are attached over the first and second side plates, respectively. A handle and a star drag are attached to the outside of the first side cover. The second side cover is attached to the second side plate on a side opposite the handle-mounting side, such that the second side cover can be opened and closed to detach and attach a spool and a brake mechanism.

In this type of dual-bearing reel, an open/close mechanism for opening and closing the second side cover is exposed on the side of the first side cover or the second side cover, and is provided to be operated from the outside of the reel.

In Japanese patent application publication 2001-145443, for example, the open/close mechanism is provided to be exposed from the first side cover on the handle-mounting side. The open/close mechanism includes one or more screws that penetrate the first or second side plate, with their heads as operating portions being exposed from the first side cover.

Japanese patent application publication 2001-54342, for example, shows an open/close mechanism that is provided to be exposed from the second side cover opposite from the handle-mounting side. This open/close mechanism includes a foldable operating portion and an interlocking portion that rotates in cooperation with the operating portion. The interlocking portion interlocks with the periphery of an opening through which the spool is passed, and which is formed in the second side plate.

In the aforementioned conventional construction in which the operation member is provided on the outside of the first side cover, a user operates, in order to detach or attach the second side cover, the operating portion of the first side cover with his right hand and loosens the screws while gripping the second side cover side of the reel with his left hand. Then, he switches his left hand's grip on the first side cover to his right hand's grip and detaches and attaches the second side cover with his left hand. Thus, every time the user wishes to detach or attach the second side cover, the user is required to switch his hand's grip on the reel. Accordingly, this operation is troublesome to the user since he cannot easily detach or attach the second side cover.

In addition, since the handle and the star drag are attached to the outside of the first side cover, it is necessary to rotate the handle and the star drag to expose the operating portion. Particularly, when the reel has two or more operation members, the user is required to rotate the handle and the star drag multiple times every time the user wishes to attach or detach the second side cover. Accordingly, this operation of detaching and attaching the second side cover proves to be troublesome to the user, since the user cannot easily detach or attach the second side cover.

Furthermore, if the aforementioned conventional operating portion is provided on the outside of the second side cover, the operating portion of the open/close mechanism may inadvertently touch the palm of user's hand when the user grips the reel unit and the fishing rod together during a palming motion. When the operating portion touches the palm of user's hand, it may cause an uncomfortable sensation to the palm of user's hand. Also, depending on the structure of the operating portion, the operating portion may be actuated by mistake.

In a low-profile type dual-bearing reel the whole of which is grippable with the human palm, if the operating portion is provided on the outside of the first side cover or the second side cover, the operating portion may protrude from the outer contour of the rest of the reel. When such is the case, the whole reel becomes large. Furthermore, the design of the reel may become less attractive.

In view of the above, it will be apparent to those skilled in the art from this disclosure that there exists a need for an improved reel unit that overcomes the problems of the conventional art. This invention addresses this need in the art as well as other needs, which will become apparent to those skilled in the art from this disclosure.

SUMMARY OF THE INVENTION

It is an object of the present invention to allow easy operation of a second side cover.

It is another object of the present invention to make the size of the reel small, while rendering an attractive appearance.

It is still another object of the present invention to provide a dual-bearing reel having a second side cover that can be opened and closed relative to a second side plate, in which a gap is less likely to be formed between the second side plate and the second side cover.

A reel unit for a dual-bearing reel in accordance with a first aspect of the present invention is adapted to be mounted to a fishing rod. The reel has a handle disposed on one side surface of the reel unit and a spool that is adapted to reel out fishing line and is disposed inside the reel unit. The reel unit has a frame that has first and second side plates between which the spool is disposed, and a connection member connecting the first and second side plates; a first side cover that is mounted to the first side plate, the handle being adapted to be mounted to the first side cover; a second side cover that is mounted to the second side plate so as to be opened and closed relative to the second side plate; and an operating portion that is provided on the second side plate without protruding from the second side plate in a direction toward the second side cover. The operation portion is designed to assume one of first and second positions, the second side cover being locked in a closed state when the operation portion assumes the second position, the operation portion allowing the second side cover to be opened and closed relative to the second side plate when the operation portion assumes the first position.

In this reel unit for a dual-bearing reel, the operating portion is provided so as to be exposed inwardly from the second side plate. Thus, the operating portion is not exposed in the side of the first side cover or the second side cover, which is not the case with a conventional reel unit. Accordingly, while a user holds the second side cover side of the reel with his left hand, he can also operate the operating portion with the left hand. Thus, the second side cover can be detached and attached easily. In addition, since the operating portion is not exposed to the outside of the first side cover, the user does not need to rotate the handle or a star drag to open the second side cover, which is not the case with a conventional reel unit. Therefore, attachment and detachment of the second side cover can be easier. On the other hand, since the operating portion is not exposed to the outside of the second side cover, user's palm does not accidentally touch the operating portion when he grips the reel unit during a palming motion.

Furthermore, since the operating portion is provided so as to be exposed inwardly from the second side plate, the operating portion is not exposed to the side of the first side cover or the second side cover. Therefore, the operating portion does not protrude from the outline of the rest of the reel unit. Thus, it is possible to make the size of the reel smaller, and while achieving a more attractive appearance.

According to a reel unit for a dual-bearing reel in accordance with a second aspect of the present invention, in the reel unit in accordance with the first aspect of the present invention, the second side cover is mounted to the second side plate via a shaft portion, the second side cover being pivotable about the shaft portion and movable in a direction of the shaft portion relative to the second side plate.

According to a reel unit for a dual-bearing reel in accordance with a third aspect of the present invention, in the reel unit in accordance with the second aspect of the present invention, the reel unit further includes an urging member that urges the second side cover in the direction to move the second side cover away from the second side plate. In this case, when the second side cover is removed from the second side plate, the second side cover can be opened and separated from the second side plate, so that the second side cover pivots automatically due to its own weight.

According to a reel unit for a dual-bearing reel in accordance with a fourth aspect of the present invention, in the reel unit in accordance with the second or third aspect of the present invention, a first end of the second side cover is attached to a fore end of the shaft portion, and the shaft portion is rotatable and movable in the direction of the shaft portion relative to the second side plate, the shaft portion being substantially parallel to a rotational axis of the spool. In this case, the second side cover is fixedly coupled to the fore end of the shaft portion, so that the second side cover can be fastened easily to the second side plate by positioning and fastening the shaft portion in a certain shaft orientation. Furthermore, since the second side cover pivots about the shaft portion that is parallel to a rotation axis of the spool, only little space is necessary in the direction of the rotation axis for attaching and detaching, and the second side cover can be attached and detached in a compact fashion.

According to a reel unit for a dual-bearing reel in accordance with a fifth aspect of the present invention, in the reel unit in accordance with the fourth aspect of the present invention, the second side cover is attached to the shaft portion in an inclined manner such that a second end of the second side cover is closer to the second side plate than the first end is.

In this the reel unit for a dual-bearing reel, the second side cover is attached to the shaft member in an inclined manner such that the second end is closer to the second side plate than the first end is. In other words, a surface of the second side cover opposite the second side plate is arranged such that it is inclined relative to and not parallel with a surface of the second side plate that is attached to the second side cover. Accordingly, the second end side of the second side cover comes in contact with the second side plate when the second side cover is positioned in alignment with the second side plate, while the first end side of the second side cover comes in contact with the second side plate when the second side cover is closed relative to the second side plate. In this case, when the second side cover is closed, the second end side of the second side cover, which is likely to being lifted up in a conventional reel unit, comes in contact with the second side plate. Therefore, even if the surface of the second side cover opposite the second side plate is formed in a distorted manner, a gap is less likely to be formed between the second side plate and the second side cover.

According to a reel unit for a dual-bearing reel in accordance with a sixth aspect of the present invention, in the reel unit for in accordance with the fifth aspect of the present invention, a surface of the second side cover that is attached to the fore end of the shaft portion is not parallel with a surface of the fore end of the shaft portion. In this case, for instance, an inclined surface is provided on an attachment portion that is provided inside the second side cover unitarily with or separately from the cover portion of the second side cover. Accordingly, it is possible to easily attach the second side cover to the second side plane in an inclined manner relative to the second side plate.

According to a reel unit for a dual-bearing reel in accordance with a seventh aspect of the present invention, in the reel unit in accordance with any of the second to sixth aspects of the present invention, a base end of the shaft portion is rotatable and movable in the direction of the shaft portion relative to the first side plate. In this case, the shaft portion is disposed between the first and second side plates. Thus, the shaft portion can be stably supported as compared with the case where the shaft portion is supported in the second side plate in the manner of a cantilever.

According to a reel unit for a dual-bearing reel in accordance with an eighth aspect of the present invention, the reel unit in accordance with any of the second to seventh aspects of the present invention further includes a restriction member that is provided in a base end of the shaft portion, the restricting member restricting an axial movement of the shaft portion. In this case, since the restriction member restricts outward movement of the shaft portion beyond a predetermined range, it is possible to prevent the second side cover from dropping off from the second side plate.

According to a reel unit for a dual-bearing reel in accordance with a ninth aspect of the present invention, in the reel unit according to any of the second to eighth aspects of the present invention, the operating portion is a lever member that is coupled to the shaft portion so as to be pivotable between the first position and the second position around the shaft portion relative to the second side plate. In this case, pivoting operation of the lever member can provide easy attachment and detachment of the second side cover.

According to a reel unit for a dual-bearing reel in accordance with a tenth aspect of the present invention, in the reel unit in accordance with any of the second to ninth aspects the present invention, the shaft portion has a shaft part and a pin member that protrudes from the shaft part. The operating portion has a through hole, the pin member being sized to pass through the through hole when the pin member is aligned with the through hole. The operating portion is in the first position when the pin member is aligned with the through hole. the operating portion is provided freely pivotably between a first position where the second side cover is opened, and a second position where the second side cover is closed. In this case, since the amount of operation of the operation portion can be reduced as compared with a conventional screw type operating portion, operation of the lever member can be performed easily.

According to a reel unit for a dual-bearing reel in accordance with an eleventh aspect of the present invention, the reel unit in accordance with any of the first to tenth aspects of the present invention, further includes a rod mounting leg portion that is provided in the frame, the fishing rod being adapted to be attached to the rod mounting leg. A length between an upper surface of the frame and a bottom surface of the rod mounting leg portion is smaller than a length of the frame along a longitudinal direction of the fishing rod. In this case, the reel unit of a so-called low-profile type dual-bearing reel, which has a frame of which the vertical length is smaller than the front-rear length. Accordingly, the operating portion is provided on the second side plate so as to protrude inwardly. Thus, the size of the reel can be made smaller, and a more attractive appearance can be obtained.

According to a reel unit for a dual-bearing reel in accordance with a twelfth aspect of the present invention, the reel unit in accordance with any of the first to eleventh aspects of the present invention, further includes guard members that are disposed to protrude upwardly from an upper surface of the frame, the guard members covering at least partially over the first and second side plates and the connection member of the frame, the amount of protrusion from the upper surface being within a range of not less than 0.1 mm and not more than 0.5 mm.

In this reel unit, the guard members that protrude upwardly within the range of not less than 0.1 mm and not more than 0.5 mm are disposed on the upper part of the reel body, such that parts of the upper surface of the frame that are likely to come into contact with the ground when the fishing rod is placed on the ground with the upper part of the reel facing downward and with the reel being attached to a fishing rod are covered with the guard members. Accordingly, it is possible to prevent the reel surface from being scratched. In addition, the amount of protrusion of the guard member from the upper surface of the frame is within a relatively small amount of the range of not less than 0.1 mm and not more than 0.5 mm. Thus, when the user grips the reel to thumb fishing line or perform palming, the guard members do not cause an uncomfortable sensation to the angler.

According to a reel unit for a dual-bearing reel in accordance with a thirteenth aspect of the present invention, in the reel unit in accordance with the third aspect of the present invention, the urging member urges the shaft portion in a direction toward the second side cover.

According to a reel unit for a dual-bearing reel in accordance with a fourteenth aspect of the present invention, in the reel unit in accordance with the eighth aspect of the present invention, the restricting member restricts the axial movement of the shaft portion by abutting on the first side plate.

According to a reel unit for a dual-bearing reel in accordance with a fifteenth aspect of the present invention, in the reel unit in accordance with the tenth aspect of the present invention, the pin member becomes aligned with the through hole by pivoting the operation portion to the first position.

According to a reel unit for a dual-bearing reel in accordance with a sixteenth aspect of the present invention, in the reel unit in accordance with the twelfth aspect of the present invention, the amount of protrusion from the upper surface is within a range of not less than 0.2 mm and not more than 0.3 mm.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
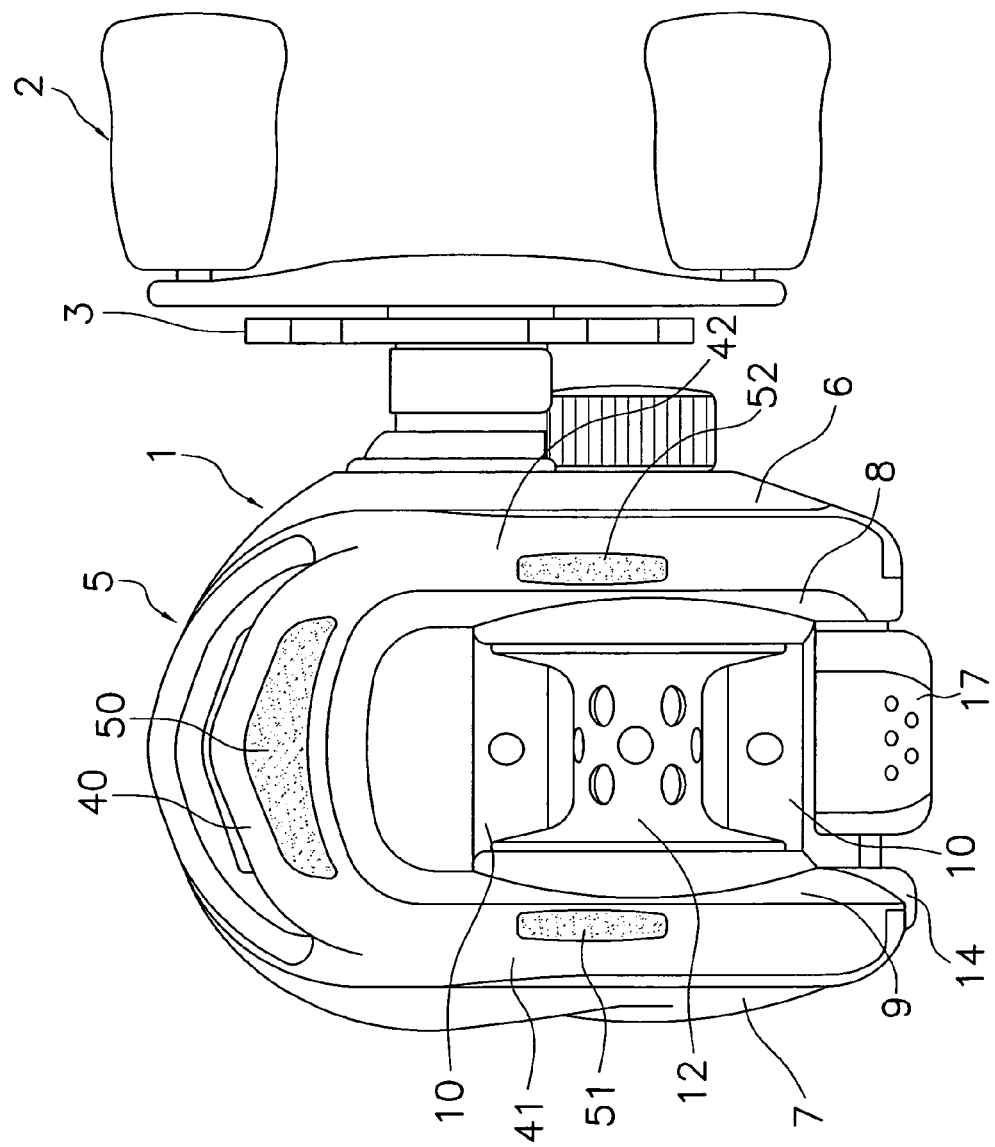
FIG. 1 is a plan view of a dual-bearing reel in accordance with an embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

A dual-bearing reel in accordance with an embodiment of the present invention is a small dual-bearing reel used for bait casting. As shown in FIG. 1 to 4, the dual-bearing reel includes a reel unit 1, a handle 2 for rotating a spool that is disposed on the side of the reel unit 1, and a star drag 3 for adjusting drag that is disposed on the same side of the reel unit 1 as the handle 2. The handle 2 is of the double-handle type and has a plate-shaped handle arm 2a that is fixedly coupled to the fore end of a handle shaft 30, and grips 2b that are attached freely rotatably to both ends of handle arm 2a as shown in FIG. 3.

Figure 2:
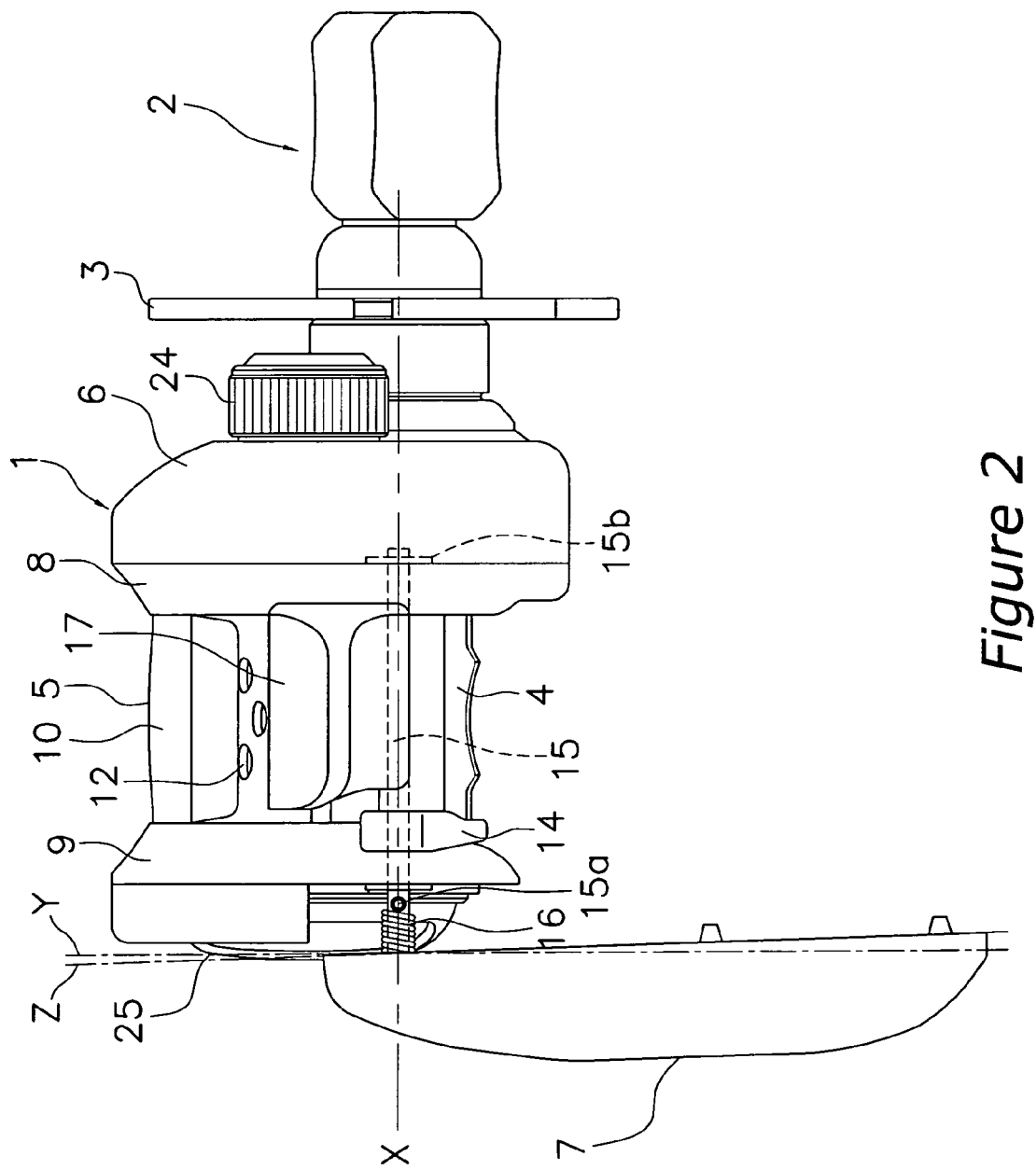
FIG. 2 is a rear view of the dual-bearing reel in accordance with the embodiment of the present invention.
Figure 3:
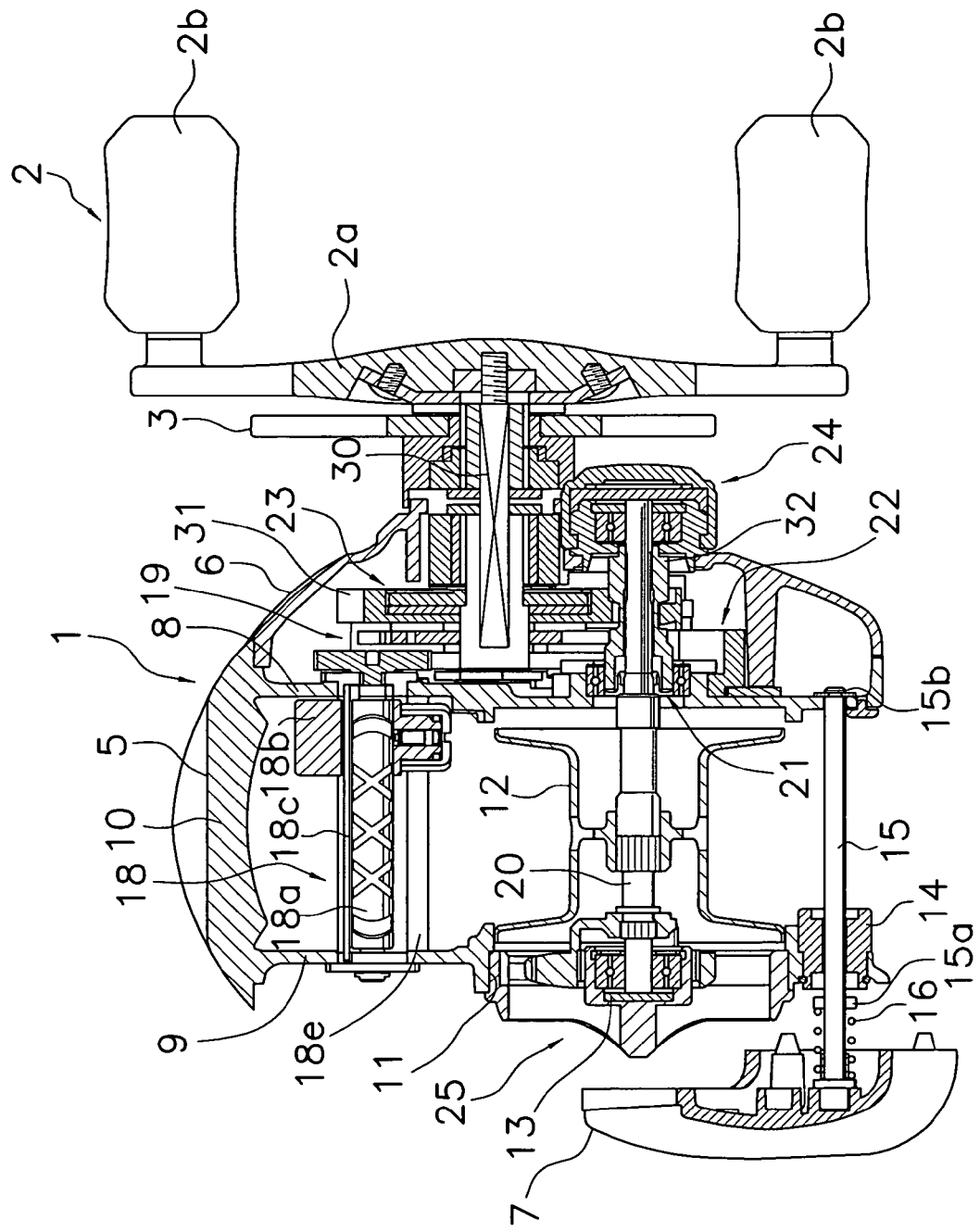
FIG. 3 is a cross-sectional view of the dual-bearing reel in accordance with the embodiment of the present invention.

As shown in FIGS. 1 to 3, the reel unit 1 is made of a light metal member such as a magnesium alloy or an aluminum alloy. Alternatively, the reel unit 1 can be made of a plastic member. The reel unit 1 has a frame 5, a first side cover 6 and a second side cover 7 that are mounted to both sides of the frame 5, a front cover 40 that is formed in an upper front portion of the frame 5 unitarily with the frame 5, and first and second top covers 41 and 42 that extend rearward from the both side ends of the front cover 40, respectively, and are formed unitarily with the front cover 40 and the frame 5. The handle 2 is attached to the outside of the first side cover 6. A first guard member 50, a second guard member 51, and a third guard member 52 are disposed on three locations of the upper parts of the front cover 40, the first top cover 41, and the second top cover 42 to protrude upwardly from the locations, respectively. The reel body 1, and the first, second and third guard members 50, 51 and 52 form the reel unit of the present invention. Herein, the rearward direction of the reel is the downward direction of FIG. 1, while the frontward direction of the reel is the upward direction of FIG. 1. Similarly, the upper direction of the reel is the upward direction in FIG. 2, while the frontward and rearward directions of the reel are respectively rightward and leftward directions in FIG. 2.

Figure 4:
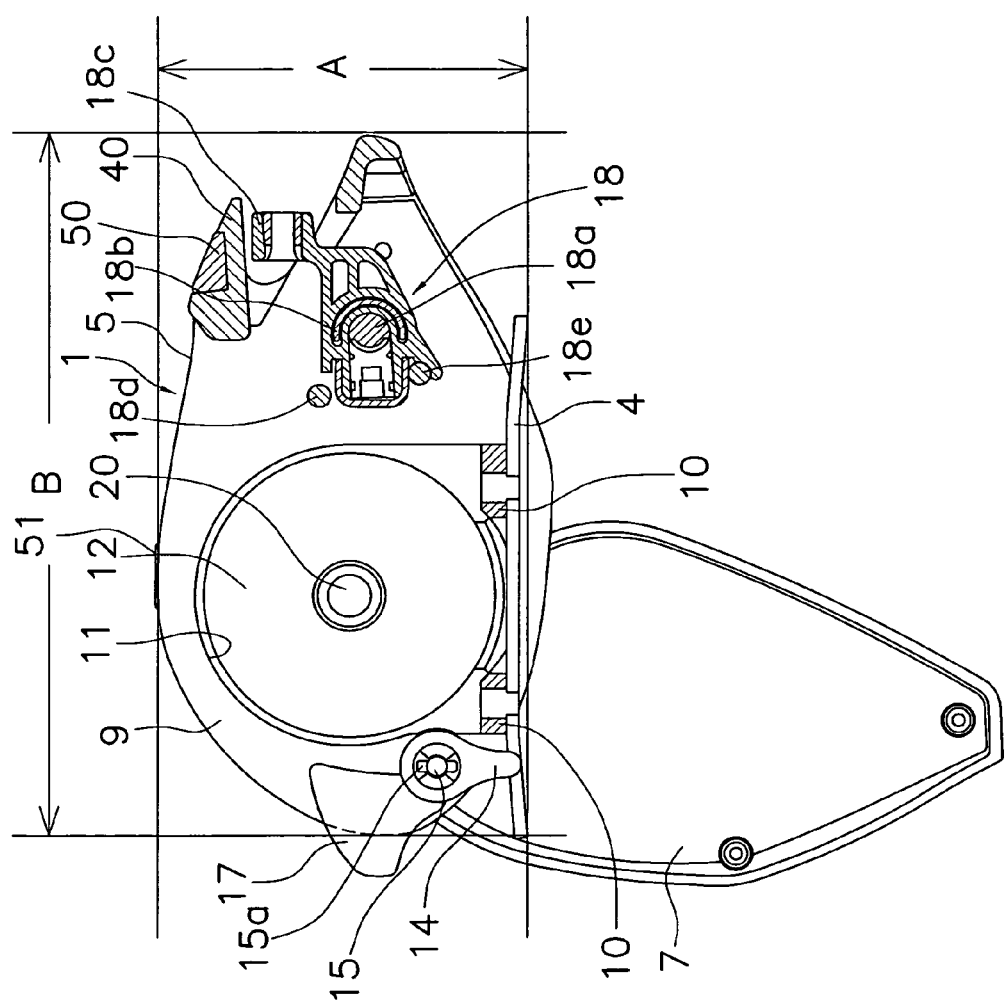
FIG. 4 is a side view of the dual-bearing reel in accordance with the embodiment of the present invention, with the second side cover being opened.

The frame 5 includes a first side plate 8 and a second side plate 9 that are disposed opposite each other across a predetermined gap, and a plurality of connection members 10 that are formed unitarily with the first side plate 8 and the second side plate 9 as shown in FIGS. 1 to 3. The first side cover 6 is attached to the outside of the first side plate 8. The second side cover 7 is attached to the outside of the second side plate 9 such that it can be opened and closed. As shown in FIG. 4, a pair of lower connection members 10 is provided at front and rear of the reel unit 1. A rod-mounting leg portion 4 for mounting the reel to a fishing rod is elongated in the front-rear directions of the reel unit 1, is made of metal, and is fixedly attached to the lower connection members 10. As shown in FIG. 4, the vertical height A from the lower surface of the rod-mounting leg portion 4 up to the upper surface of the frame 5 is shorter than the front-rear length B along the longitudinal direction of the fishing rod of the frame 5. Thus, the frame 5 is a so-called low-profile type dual-bearing reel, the whole of which is grippable with a human palm.

As shown in FIG. 3, the spool 12 that is supported by a spool shaft 20, a clutch lever 17 and a level wind mechanism 18 are disposed inside the frame 5. The clutch lever 17 functions as a thumb rest when thumbing the fishing line, and the level wind mechanism 18 serves to uniformly wind fishing line around the spool 12.

A gear mechanism 19, a clutch mechanism 21, a clutch control mechanism 22, a drag mechanism 23, and a casting control mechanism 24 are disposed in the space between the frame 5 and the first side cover 6. The gear mechanism 19 transmits rotational force from the handle 2 to the spool 12 and the level wind mechanism 18. The clutch control mechanism 22 controls the clutch mechanism 21 in accordance with the operation of the clutch lever 17. The drag mechanism 23 brakes the spool 12. The casting control mechanism 24 serves to adjust the resistance that occurs when the spool 12 rotates. The gear mechanism 19 includes a handle shaft 30, a main gear 31 fixedly coupled to the handle shaft 30, and a tubular pinion gear 32 that meshes with the main gear 31. In addition, a centrifugal braking mechanism 25 that serves to control backlash during the casting is disposed between the frame 5 and the second side cover 7.

As shown in FIGS. 1 to 4, the first and second side plates 8 and 9 are formed in a non-circular shape, such as a substantially ellipse shape when viewed laterally. The first and second side covers 6 and 7 are formed so that they have the same shape as the first and second side plates 8 and 9.

A circular opening 11 for attaching/removing the spool 12 is formed on the second side plate 9 slightly above the center of the second side plate 9, as shown in FIG. 4. A spool support portion 13 that supports the left end of the spool shaft 20 is detachably attached to the inner periphery of the opening 11 as shown in FIG. 3.

As shown in FIG. 1, the front cover 40, the first top cover 41, and the second top cover 42 are made of an aluminum alloy or a stainless steel alloy, and formed above the frame 5 unitarily with the frame 5. The front cover 40, the first top cover 41, and the second top cover 42 are in a substantially U shape. The front cover 40, the first top cover 41, and the second top cover 42 function as a so-called thumb rest, which is gripped when the user thumbs the fishing line or performs palming. Various kinds of processing of surface treatments, such as an alumite treatment or anodizing treatment, a plating treatment, a painting treatment, and so on, are performed on the surfaces of the front cover 40, the first top cover 41, and the second top cover 42. A first guard member 50, a second guard member 51, and a third guard member 52 are disposed on three locations on the upper surfaces of the front cover 40, the first top cover 41, and the second top cover 42 to protrude upwardly from the surfaces, respectively.

The first, second and third guard members 50, 51 and 52 are three plate-shaped members formed of thin metal plates of an aluminum alloy or a stainless steel alloy. The amounts of protrusion of the first guard member 50, the second guard member 51 and the third guard member 52 from the front cover 40, the first top cover 41 and the second top cover 42 are within a range of not less than 0.1 mm and not more than 0.5 mm, preferably within a range of not less than 0.2 mm and not more than 0.3 mm. The first, second and third guard members 50, 51 and 52 are embedded in three attachment recessed portions (not shown) that are formed in the same shapes as the outlines of the first, second and third guard members 50, 51 and 52. They are fixedly attached by an adhesive agent applied to the inside of the attachment recessed portions. The first guard member 50 has a shape with a long side extending in the longitudinal direction of the front cover 40 (the lateral direction in FIG. 1). The second guard member 51 and the third guard members 52 have shapes with long sides extending in the longitudinal direction of the first top cover 41 and the second top cover 42 (the front-rear direction of the reel as shown in FIG. 1). The first guard member 50, the second guard member 51, and the third guard member 52 are respectively attached to the upper surfaces of the front cover 40, the first top cover 41, and the second top cover 42 at three locations that are likely to come in contact with the ground when the fishing rod is placed on the ground with the upper part of the fishing reel facing the ground and with reel being mounted to the fishing rod. Specifically, the first guard member 50, the second guard member 51, and the third guard member 52 are respectively attached to three locations of the upper surfaces of the front cover 40, the first top cover 41, and the second top cover 42 that are furthermost from the fishing rod.

Figure 15:
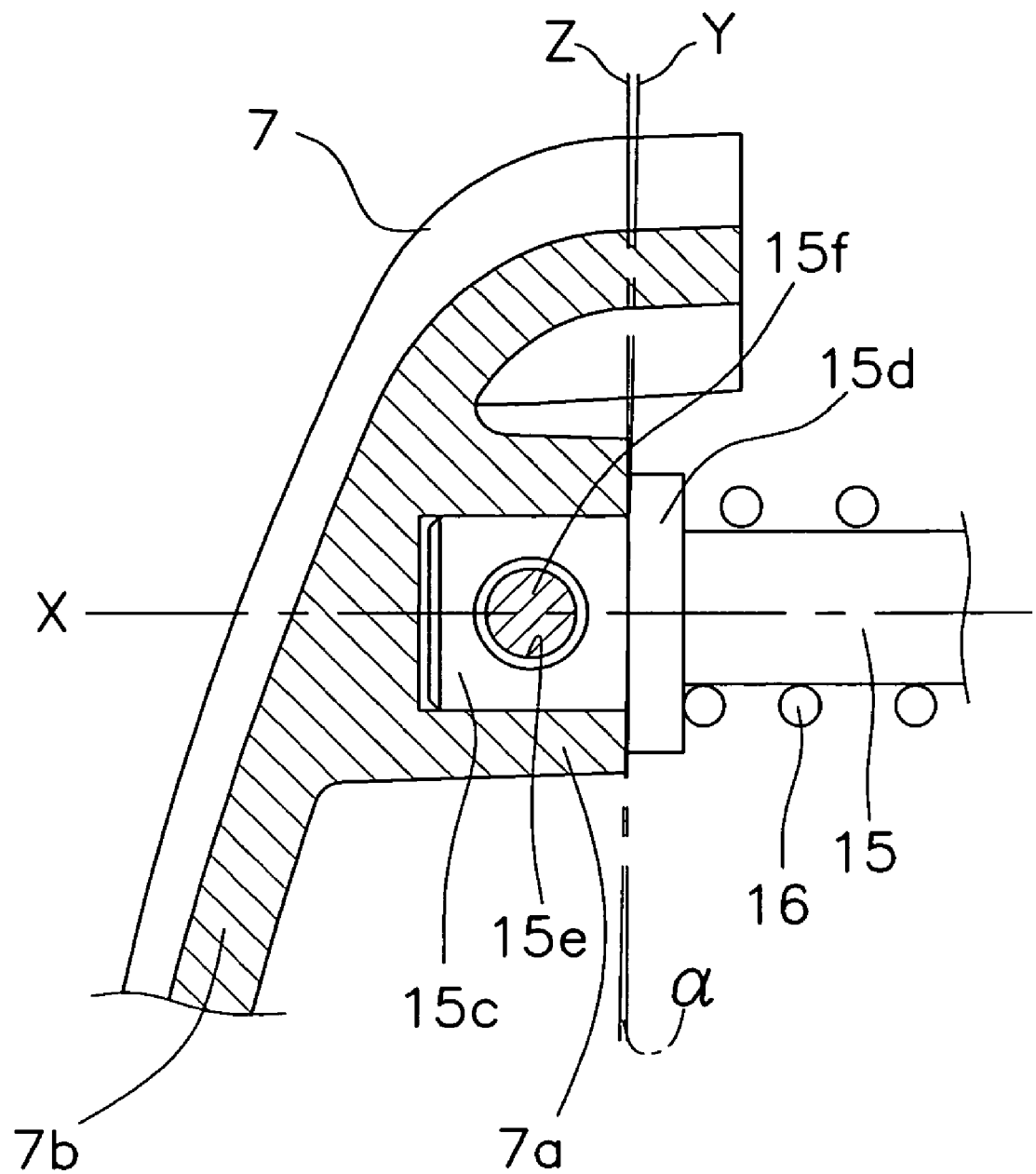
FIG. 15 is an enlarged cross-sectional view of an attachment portion of the second side cover that is attached to the pivot shaft.

As shown in FIGS. 2 and 15, the second side cover 7 is attached to the pivot shaft 15 in an inclined manner such that the fore end side of the second side cover 7 is closer to the second side plate 9 than its base end side. As shown in an enlarged view of FIG. 15, the second side cover 7 has a cover portion 7b and a closed-ended cylindrical attachment portion 7a that is unitarily formed with the cover portion 7b and protrudes from the internal surface of the cover portion 7b. The fore end 15c of the pivot shaft 15 is secured to the attachment portion 7a by press fitting. The pivot shaft 15 has a large diameter portion 15d that comes in contact with a surface of the attachment portion 7a on a side opposite the second side plate 9. The surface of the attachment portion 7a opposite the second side plate 9 is inclined such that the fore end side of the second side cover 7 is closer to the second side plate 9, and accordingly the surface of the attachment portion 7a is inclined relative to the fore end surface of the large diameter portion 15d of the pivot shaft 15. A threaded portion 15e is formed in the fore end 15c so as to extend through the fore end 15c in the radial direction (a direction perpendicular to the paper plane of FIG. 15). The fore end 15c is fastened to the attachment portion 7a with an Allen set-screw 15f, for example.

In the second side cover 7, as shown in FIGS. 2 and 15, the surface of the attachment portion 7a opposed to the second side plate 9 is inclined along an axis Z that intersects an axis Y, which is perpendicular to an axis X of the pivot shaft 15. As shown in FIG. 2, the axis Y is arranged so as to extend in parallel with the surface of the second side plate 9, which is opposite the second side cover 7. The axis Z is arranged to intersect the axis Y such that the fore end side of the second side cover 7 is closer to the second side plate 9. The angle of inclination α between the axis Z and the axis Y (see FIG. 15) is preferably within a range of not less than 0.5° and not more than 3°. In the example shown in FIG. 15, the angle of inclination α is 1°.

As shown in FIGS. 1 to 4, an operating lever 14 for opening and closing the second side cover 7 is freely pivotably attached to the rear inner side of the second side plate 9 so as not to protrude in a direction toward the second side cover 7. The operating lever 14 is attached to a pivot shaft 15 which is supported by the first and second side plates 8 and 9. The second side cover 7 is fixedly coupled to the fore end of the pivot shaft 15. The second side cover 7 is urged in the direction to move away from the second side plate 9 by a spring member 16. A pin member 15a that penetrates the pivot shaft 15 in the radial direction of the pivot shaft 15 and protrudes from the pivot shaft 15 is attached to the pivot shaft 15 on the side near the second side cover 7 such that the pin member 15a can contact the end of the spring member 16.

The operating lever 14 is a lever-shaped member attached to the pivot shaft 15 freely pivotably in the front-rear direction as shown in FIGS. 1 through 14. As shown in FIGS. 11 through 14, the operating lever 14 has an attachment portion 14a that has a substantially circular shape when viewed laterally and is attached to the pivot shaft 15, and an operating portion 14b that is formed unitarily with the attachment portion 14a and extends downwardly from the attachment portion 14a for being operated by the user who grasps the operating portion 14b with his thumb and finger.

As shown in FIGS. 7 to 10, the attachment portion 14a has a through hole 14c that penetrates in the lateral direction, a first recessed portion 14d that connects to the left end of the through hole 14c and has a diameter larger than that of the through hole 14c, and a second recessed portion 14e that connects to the right end of the through hole 14c and has a diameter larger than that of the through hole 14c.

The attachment portion 14a further has a groove 14f that is formed along the circumferential direction on the outer periphery of the first recessed portions 14d. An O-ring 14g is attached to the groove 14f. The O-ring 14g is a ring for securing the operating lever 14 non-movably in the axial direction relative to the second side plate 9, and is attached so as to be in contact with both the groove 14f and the second side plate 9. The O-ring 14g is made of synthetic resin, and is configured to prevent the operating lever 14 from pivoting when the pivoting force is smaller than a predetermined level. Accordingly, the operating lever 14 can maintain its posture at a predetermined pivot position.

Figure 11:
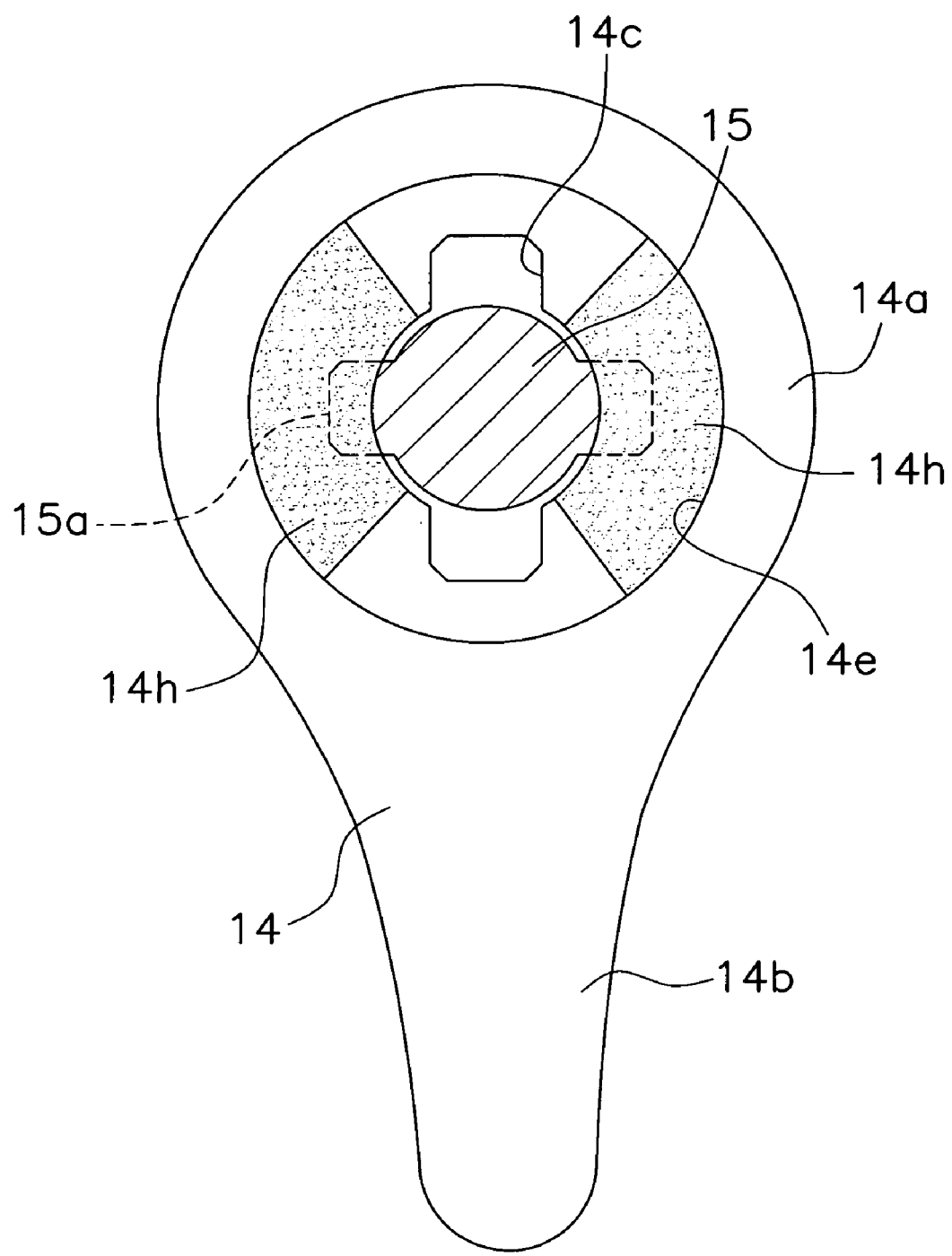
FIG. 11 is an enlarged side view of the lever member and the pin member in accordance with the embodiment of the present invention, when the lever member is in the first position and the second side cover is opened.
Figure 12:
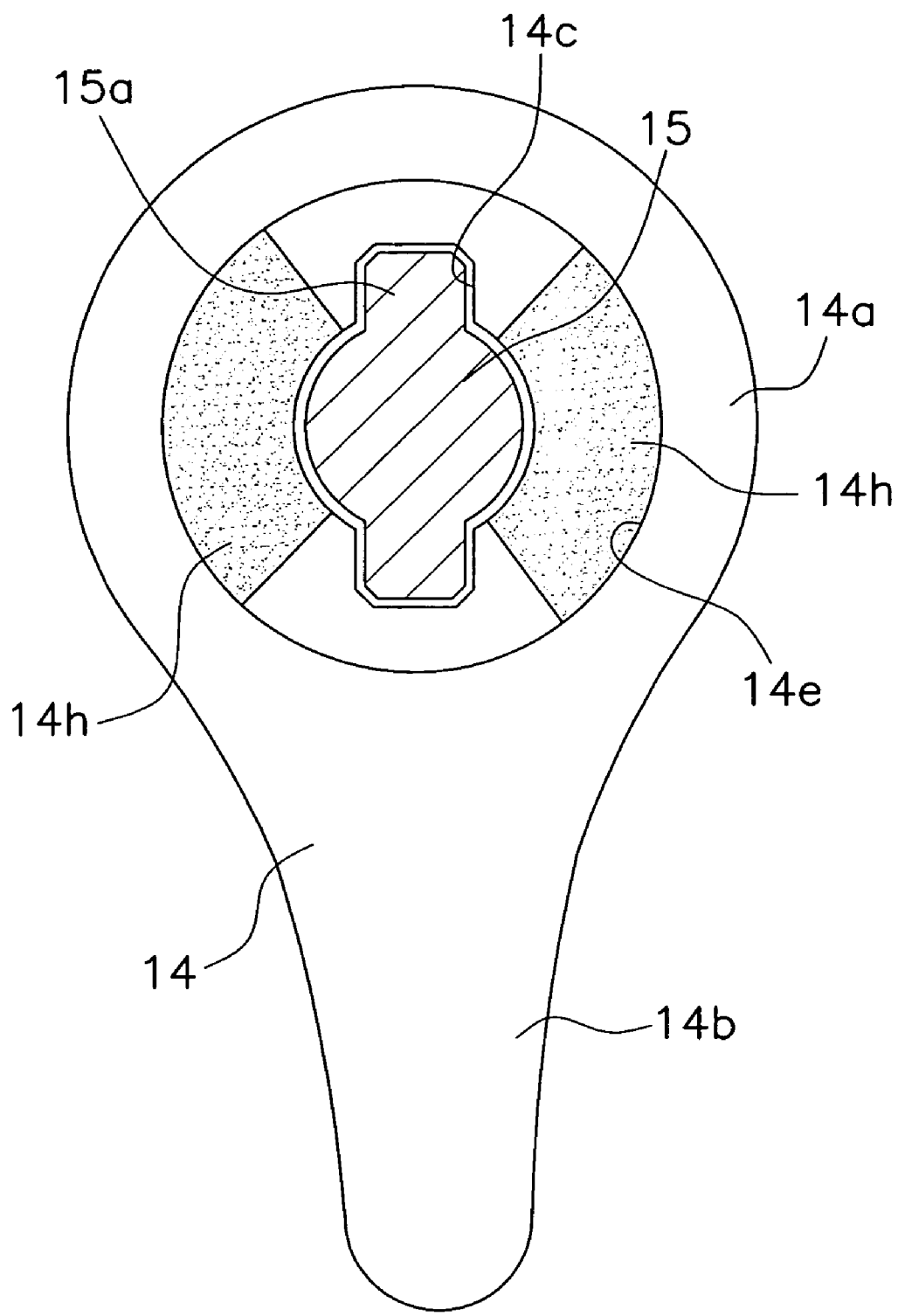
FIG. 12 is an enlarged side view of the lever member and the pin member in accordance with the embodiment of the present invention corresponding to FIG. 11, when the second side cover is pivoted.
Figure 13:
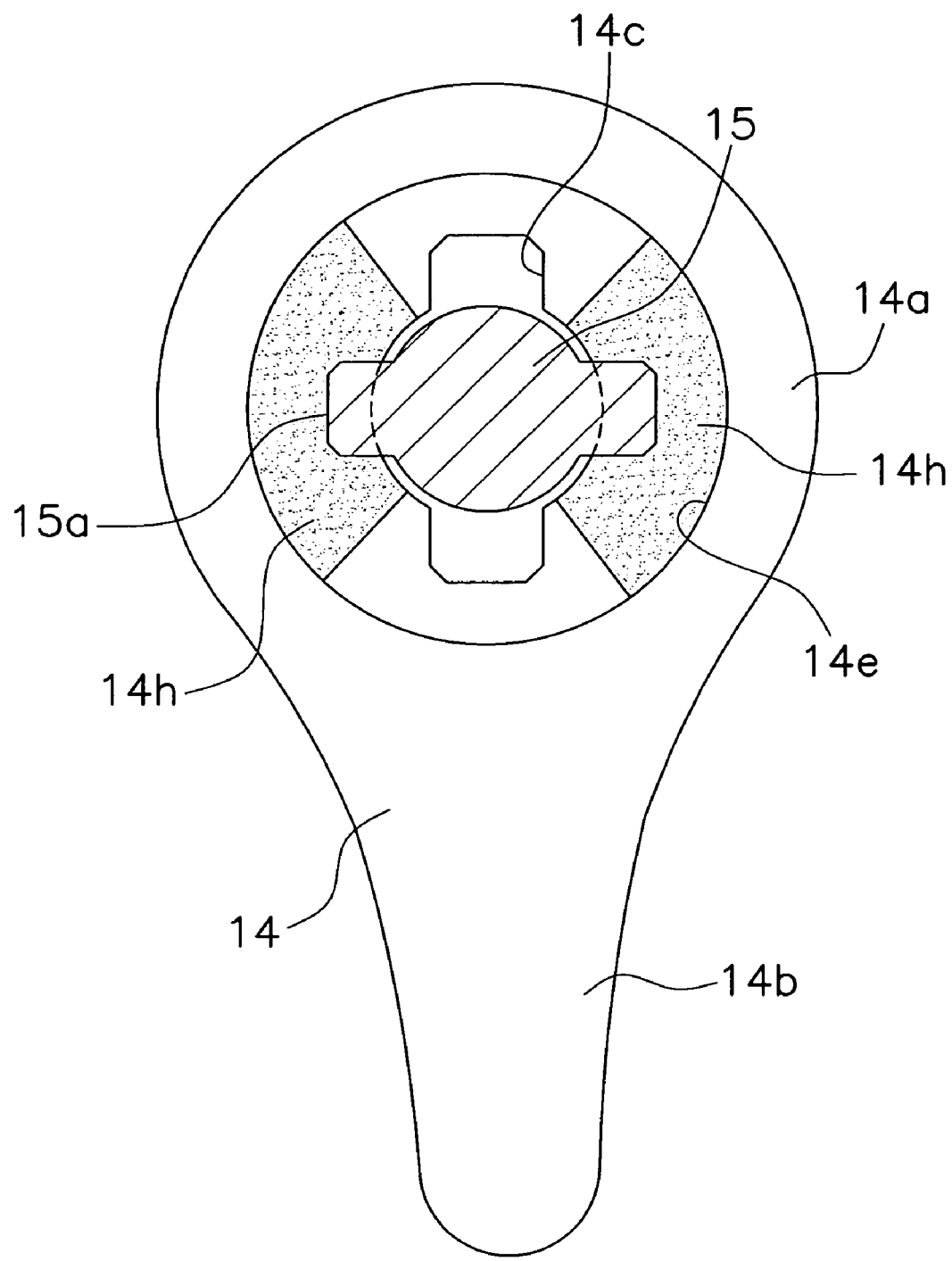
FIG. 13 is an enlarged side view of the lever member and the pin member in accordance with the embodiment of the present invention corresponding to FIG. 11, when the second side cover is closed.
Figure 14:
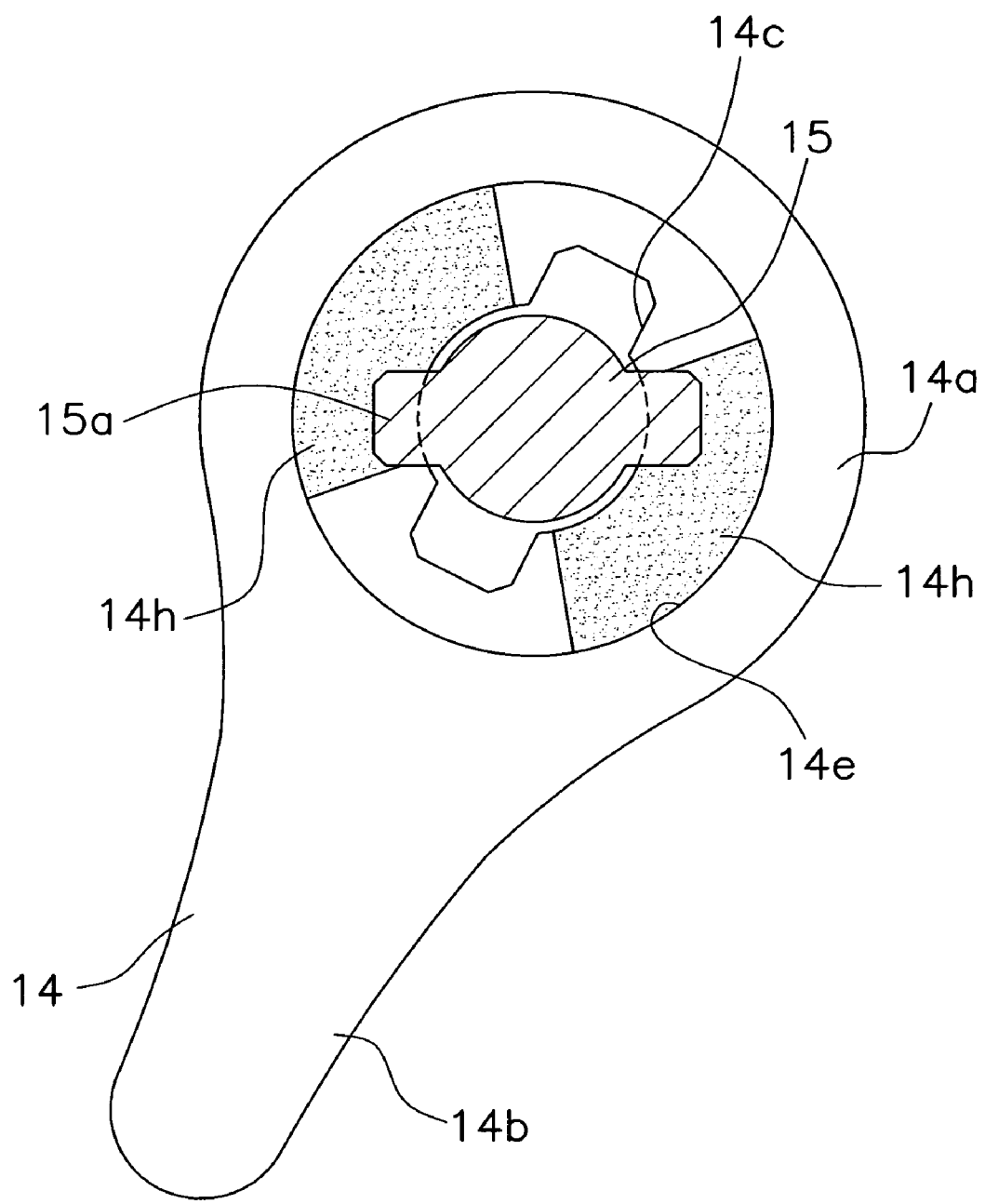
FIG. 14 is an enlarged side view of the lever member and the pin member in accordance with the embodiment of the present invention corresponding to FIG. 11, when the lever member is pivoted to the second position.

As shown in FIGS. 11 to 14, the operating portion 14b is formed in a tapered shape so as to smoothly connect with the shape of the attachment portion 14a. The fore end of the operating portion 14b is formed in a rounded shape, and is pivoted frontward and rearward to be operated by the user who seizes the operation portion 14b with his thumb and finger. As shown in FIGS. 11 to 13, when the operating portion 14b is pivoted frontward, thus its fore end is positioned downward (hereinafter referred to as a first position), the second side cover 7 can be opened. On the other hand, as shown in FIG. 14, when the operating portion 14b is pivoted rearward from the first position, thus its fore end is positioned rearward (hereinafter referred to as a second position), the second side cover 7 is closed. In FIGS. 11–14, the left hand side corresponds to the forward direction of the reel, while the right hand side corresponds to the rearward direction of the reel.

As shown in FIGS. 11 to 14, the through hole 14c is formed in a non-circular shape such that the pin member 15a of the pivot shaft 15 can be inserted into and passed through the through hole 14c. As shown in FIGS. 7 to 10, the first recessed portion 14d and the second recessed portion 14e are recessed portions that have a circular shape when viewed laterally with diameters that are large enough for the pin member 15a of the pivot shaft 15 to be rotated inside the first recessed portion 14*d* and the second recessed portion 14*e*. As shown in FIGS. 7 to 14, inclined surfaces 14*h* are formed on the bottom of the second recessed portion 14*e*, such that the inclined surfaces 14*h* can come into contact with the pin member 15*a* of the pivot shaft 15. As shown in FIGS. 11–13, the inclined surfaces 14*h* are formed in two locations, on the right and left sides. The inclined surfaces 14*h* are formed such that each of their surfaces becomes heightened in the counter clockwise direction as seen in FIGS. 11–14. More specifically, the inclined surface 14*h* on the left side in FIGS. 11–13 is formed such that its surface becomes higher from the upper side to the lower side as seen in FIGS. 11–13. Conversely, the inclined surface 14*h* on the right side in the figure is formed such that its surface becomes higher from the lower side to the upper side as seen in FIGS. 11–13.

As shown in FIGS. 2 to 6, the pivot shaft 15 is a shaft member disposed in parallel to the spool shaft 20 and the handle shaft 30. As shown in FIGS. 2 and 4, the pivot shaft 15 is disposed under the clutch lever 17 in the rear of the frame 5. Both ends of the pivot shaft 15 are supported by the first and second side plates 8 and 9 freely rotatably and axially movably.

The fore end of the pivot shaft 15 penetrates the second side plate 9, and is non-movably coupled to the internal surface of the second side cover 7. The aforementioned pin member 15*a* is provided in a part of the pivot shaft 15 between the second side plate 9 and the second side cover 7. As shown in FIGS. 2, 3, 5, and 6, a restriction member 15*b* that restricts axial movement of the pivot shaft 15 to within a predetermined range is attached to the base end of the pivot shaft 15. The base end of the pivot shaft 15 is disposed between the first side plate 8 and the first side cover 6.

Figure 7:
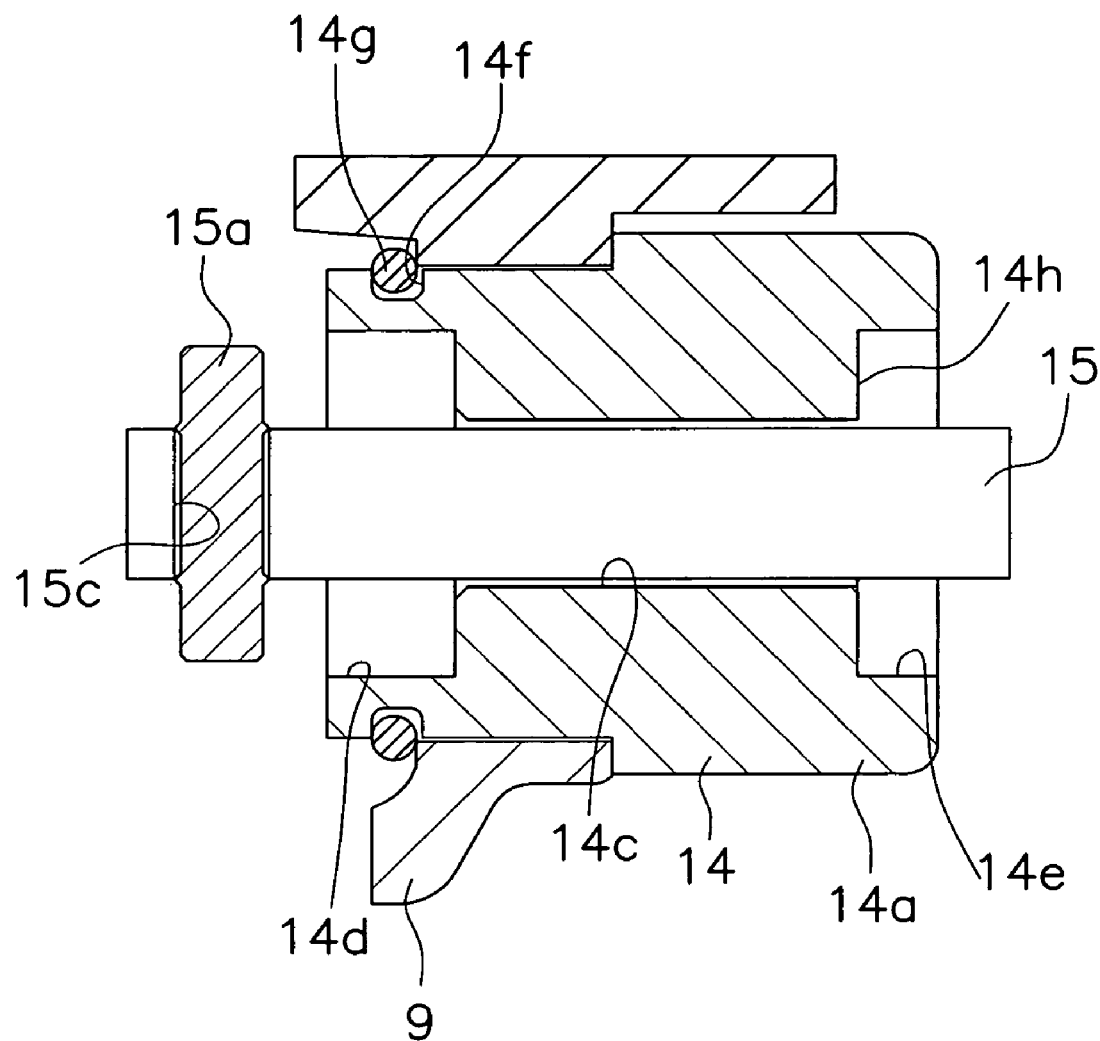
FIG. 7 is an enlarged cross-sectional view of a lever member in accordance with the embodiment of the present invention, when the second side cover is opened.
Figure 10:
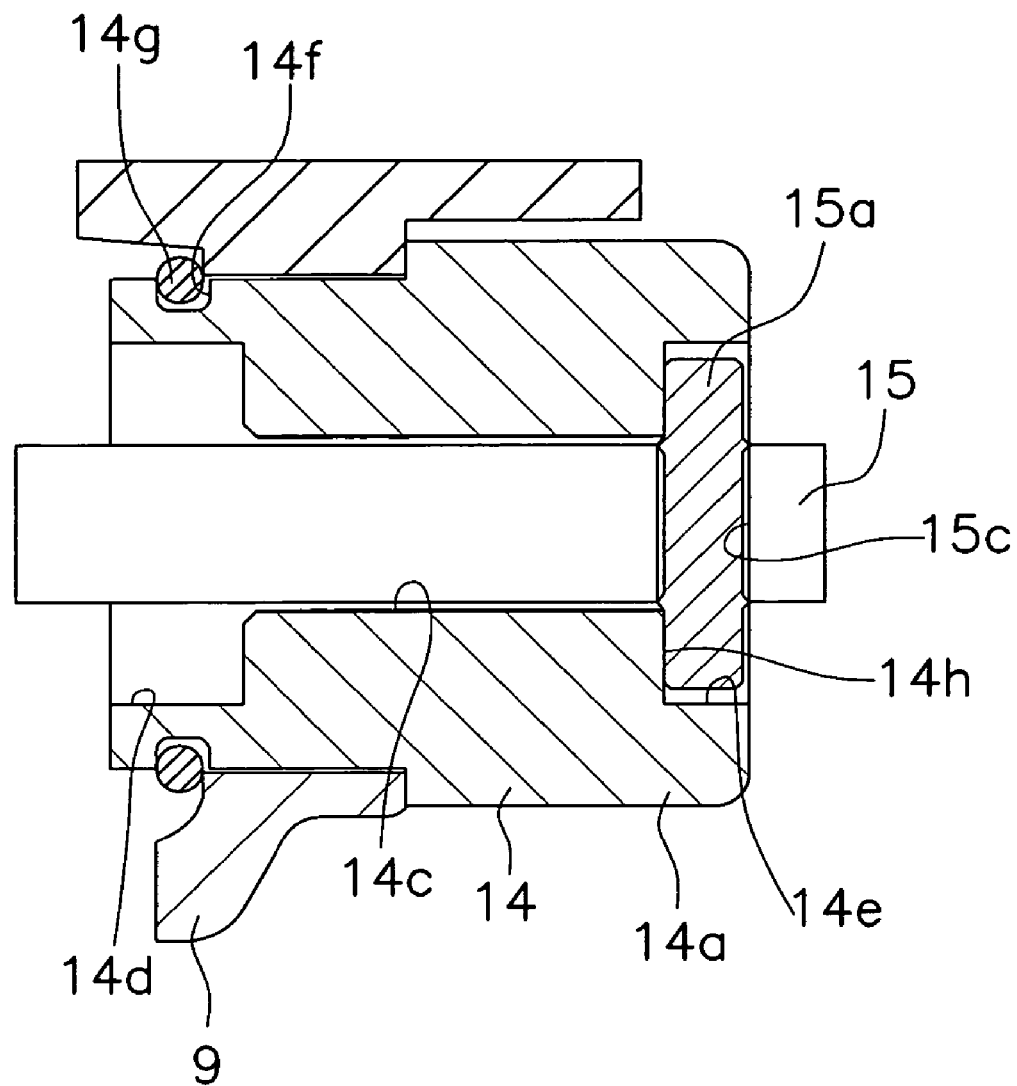
FIG. 10 is a an enlarged cross-sectional view of the lever member in accordance with the embodiment of the present invention corresponding to FIG. 7, when the second side cover is pivoted.

As shown in FIGS. 7 and 10, the pin member 15*a* is a rod shaped member that is fitted by caulking into the through hole 15*c* formed in the pivot shaft 15. The pin member 15*a* penetrates through and protrudes from the pivot shaft 15. The pin member 15*a* can be inserted into and passed through the through hole 14*c* on the operating lever 14 and the first recessed portion 14*d*. The pin member 15*a* can come in contact with the inclined surfaces 14*h* of the second recessed portion 14*e* when the second side cover 7 is closed.

Figure 5:
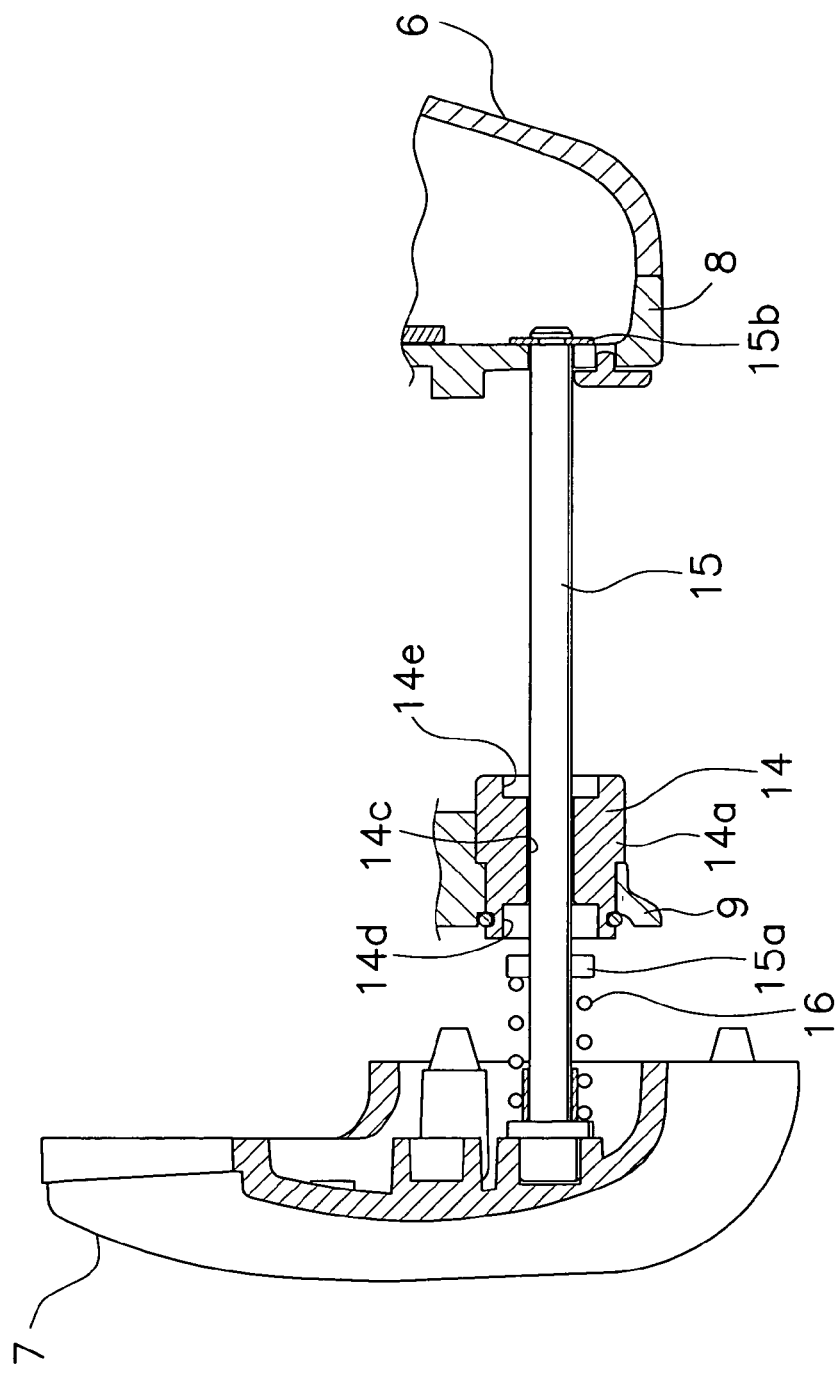
FIG. 5 is an enlarged cross-sectional view of an open/close mechanism in accordance with the embodiment of the present invention, when the second side cover is opened.
Figure 6:
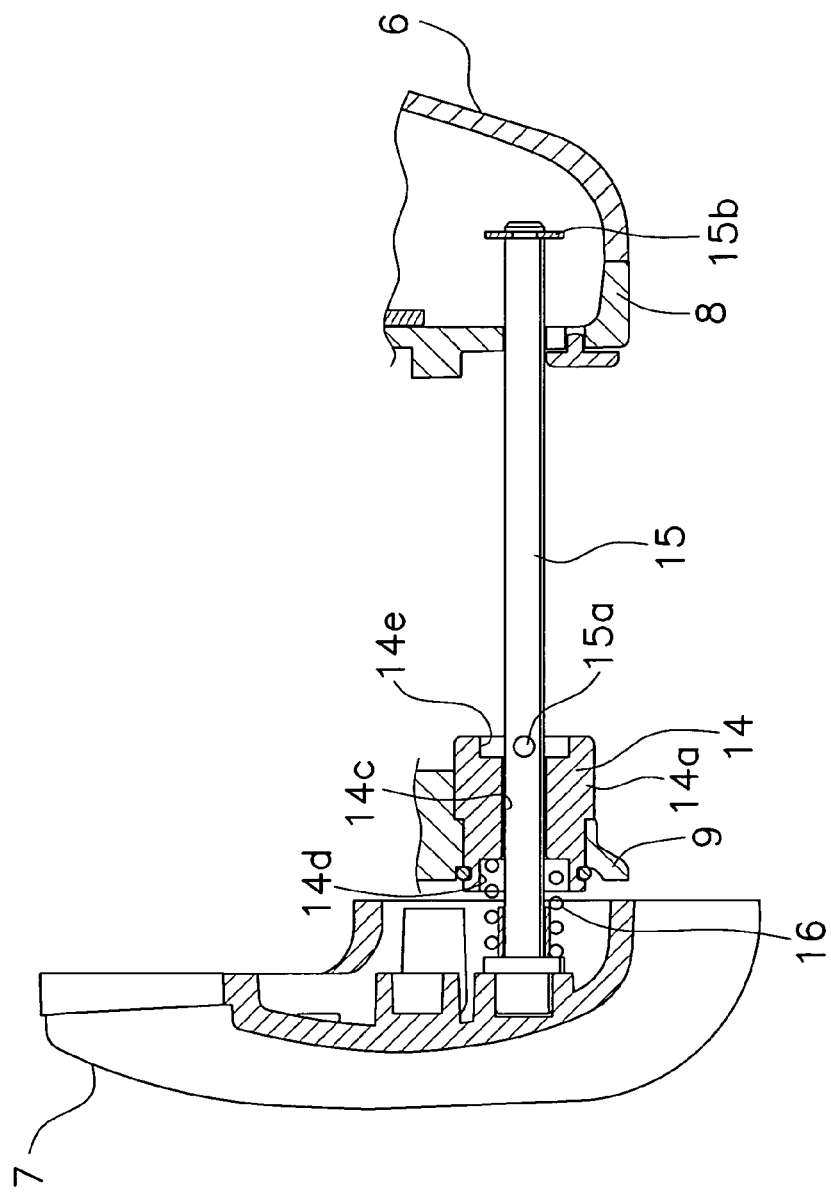
FIG. 6 is an enlarged cross-sectional view of the open/close mechanism in accordance with the embodiment of the present invention corresponding to FIG. 5, when the second side cover is closed.

As shown in FIGS. 5 and 6, the restriction member 15*b* is an E-shaped retaining ring that is secured to the base end of the pivot shaft 15. This restriction member 15*b* is provided to prevent the second side cover 7 from dropping off from the reel when the second side cover 7 is opened as shown in FIG. 5. FIG. 5 shows the state where the second side cover 7 is opened.

As shown in FIGS. 2, 3, 5, and 6, the spring member 16 is a coil spring disposed between the second side cover 7 and the pin member 15*a*, and urges the second side cover 7 in the direction away from the second side plate 9. When the pin member 15*a* is located in the through hole 14*c* or the second recessed portion 14*e*, the spring member 16 comes in contact with the bottom of the first recessed portion 14*d*, as shown in FIG. 6. FIG. 6 shows the state where the second side cover 7 is closed. Accordingly, the second side cover 7 is urged in the direction away from the second side plate 9 such that the second side cover 7 can be opened.

In the dual-bearing reel of this construction, to remove the spool 12 from the reel unit 1, for example when backlash has caused the fishing line to become entangled with the spool 12, it is necessary to open the second cover 7, revealing the opening 11 in the second side plate 9.

Figure 8:
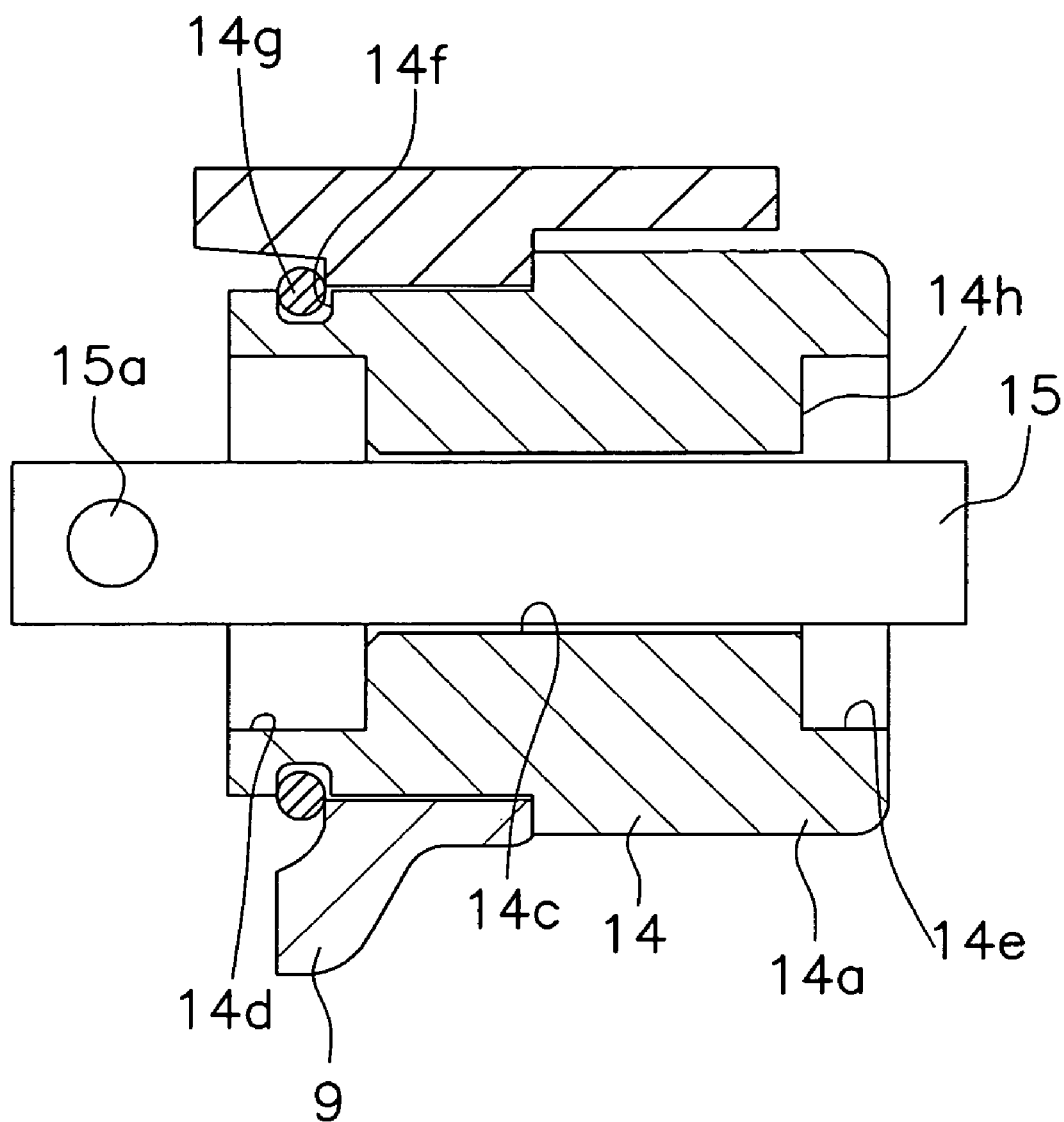
FIG. 8 is an enlarged cross-sectional view of the lever member in accordance with the embodiment of the present invention corresponding to FIG. 7, when the second side cover is pivoted.

To open the second side cover 7, the operating lever 14 is pivoted from the second position shown in FIG. 14 to the first position shown in FIG. 13. In other words, the operating lever 14 is pivoted from the second position, where the second side cover 7 is locked in a closed state, to the first position, where the second side cover 7 is allowed to open and close relative to the second side plate 9. Subsequently, the second side cover 7 is pivoted from the position where the pin member 15*a* of the pivot shaft 15 cannot be inserted into and passed through the through hole 14*c* (see FIGS. 10 and 13) to the position where the pin member 15*a* can be inserted into and passed through the through hole 14*c* (see FIGS. 9 and 12). At this point, since the second side cover 7 and the pivot shaft 15 are urged in a direction away from the second side plate 9 by the spring member 16, the second side cover 7 and the pivot shaft 15 are automatically moved toward the left hand side as seen in FIG. 5 until the restriction member 15*b* reaches the first side plate 8 as shown in FIG. 5. At this point, the pin member 15*a* has passed through the through hole 14*c*, and is now located on the left hand side relative to the first recessed portion 14*d* as seen in FIG. 8. Then, as shown in FIGS. 2-4 and 5, the second side cover 7 and the pivot shaft 15 rotate due to the weight of the second side cover 7. In this manner, the second side cover 7 is opened.

Figure 9:
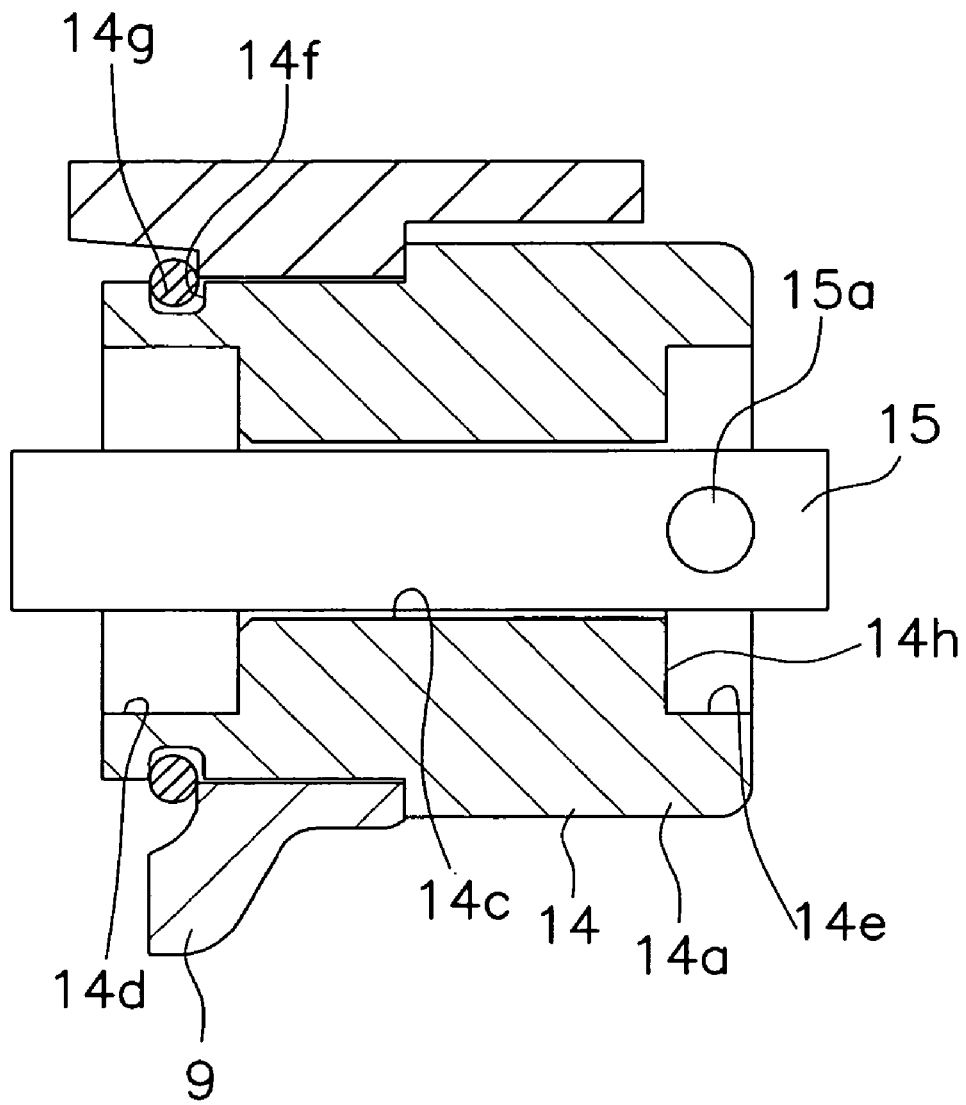
FIG. 9 is an enlarged cross-sectional view of the lever member in accordance with the embodiment of the present invention corresponding to FIG. 7, when the second side cover is closed.

On the other hand, to close the second side cover 7, the second side cover 7 is pivoted in the opposite direction. More specifically, the second side cover 7 is pivoted from the position where the pin member 15*a* of the pivot shaft 15 cannot be inserted into and passed through the through hole 14*c* (shown in FIGS. 7 and 11) to the position where the pin member 15*a* can be inserted into and passed through the through hole 14*c* (shown in FIGS. 8 and 12). Subsequently, the second side cover 7 and the pivot shaft 15 are moved toward the second side plate 9, to the right hand side as seen in FIG. 9, against the urging force of the spring member 16, such that the pin member 15*a* is inserted into and passed through the through hole 14*c*, and is now located at the second recessed portion 14*e* (see FIG. 9). The second side cover 7 is then pivoted to the position where the pin member 15*a* of the pivot shaft 15 cannot be inserted into and passed through the through hole 14*c* (shown in FIGS. 10 and 13).

Finally, the operating lever 14 is pivoted from the first position shown in FIG. 13 to the second position shown in FIG. 14, and the pin member 15*a* comes into contact with the inclined surfaces 14*h*. In this case, the second side cover 7 and the pivot shaft 15 are urged by the spring member 16 in the left hand side direction as seen in FIG. 9. The inclined surfaces 14*h* are inclined such that each of their surfaces becomes heightened in the counter clockwise direction. In other words, the lower side of the surface as seen in FIG. 14 is higher than the upper side in the left hand side inclined surface 14*h*, and that the upper side of the surface is higher than the lower side in the right hand side inclined surface 14*h*. Thus, the heightened portions of the inclined surfaces 14*h* frictionally engage with the pin member 15*a*, thereby preventing the pin member 15*a* from moving in the left hand side direction as seen in FIG. 9 despite the biasing force of the spring member 16. At the same time, the operating lever 14 is pressed toward the second side plate 9 due to the biasing force of the spring member 16. Thus, the operating lever 14 is snugly positioned in the second position.

In the reel unit 1 of this construction, the operating lever 14 that opens and closes the second side cover 7 is provided so as to protrude from the second side plate 9. Accordingly, while the user holds the second side cover 7 side with his left hand, he can also operate the operating lever 14 with his left hand, and easily detach or attach the second side cover 7 from or to the second side plate 9.

In addition, since the operating lever 14 is not exposed to the outside of the first side cover 6, the user does not need to rotate the handle 2 or the star drag 3 to detach or attach the second side cover 7, which is not the case with a conventional reel unit. Therefore, attachment and detachment of the second side cover 7 can be performed more easily. On the other hand, since the operating lever 14 is not exposed to the outside of the second side cover 7, the user's palm is less likely to touch the operating lever 14 accidentally when he grips the reel unit 1 during a palming motion.

Further more, the second side cover 7 is attached to the pivot shaft 15 in an inclined manner such that the fore end side of the second side cover 7 is closer to the second side plate 9 than the base end side. Accordingly, when the second side cover 7 is closed, the fore end side of the second side cover 7 stays securely in contact with the second side plate 9, while the fore end side of the second side cover of a conventional reel is prone to undesirably lift up. Therefore, even if the opposing surfaces of the second side cover 7 and the second side plate 9 are manufactured in an distorted manner, a gap is less prone to appear between the second side cover 7 and the second side plate 9.

Still further more, the first guard member 50, the second guard member 51, and the third guard member 52 are respectively disposed on the upper parts of the front cover 40, the first top cover 41, and the second top cover 42 so as to protrude therefrom. Accordingly, the first, second and third guard members 50, 51 and 52 are disposed at three locations that are likely to come into contact with the ground when the fishing rod is placed on the ground with the upper part of the reel facing downward with the reel being attached to a fishing rod. Accordingly, it is possible to prevent the reel surface from being scratched. In addition, the amounts of protrusion of the first guard member 50, the second guard member 51 and the third guard member 52 from the front cover 40, the first top cover 41 and the second top cover 42 respectively are within a relatively small range of not less than 0.1 mm and not more than 0.5 mm, preferably within a range of not less than 0.2 mm and not more than 0.3 mm. Accordingly, when an angler grips the reel to thumb fishing line or perform palming, the guard members 50, 51, 52 do not cause an uncomfortable sensation to the angler.

OTHER EMBODIMENTS (a) In the aforementioned embodiment, the dual-bearing reel having a non-circular shape is described as an example, but the present invention is not limited to such construction. For example, the present invention can also be applied to a round type dual-bearing reel having a rounded shape. In addition, the present invention is not limited to a low-profile type dual-bearing reel.

(b) In the aforementioned embodiment, the spring member 16 and the inclined surfaces 14h are provided as an interlock mechanism for the second side cover 7, but the interlock mechanism of the present invention is not limited to this construction. For example, an interlock protrusion and an interlock recessed portion may be provided in the second side cover 7 and the second side plate 9 respectively, such that the interlock protrusion and the interlock recessed portion may interlock the second side cover 7. In addition, a bayonet structure or the like may be employed as an interlock mechanism, such that the bayonet structure can elastically engage with the second side cover 7 by press-fitting.

(c) In the aforementioned embodiment, the operating lever 14 is disposed on the rear lower side of the second side plate 9. However, the operating lever 14 can be disposed in any position as long as it is on the inside surface of the second side plate 9. In addition, the shape of the operating lever 14 does not have to be a lever shape.

(d) In the aforementioned embodiment, the restriction member 15b is disposed at the base end of the pivot shaft 15. Alternatively, the restriction member 15b can be disposed so as to adjoin the operating lever 14, for example.

(e) In the aforementioned embodiment, the pivot shaft 15 is supported by the first side plate 8 and the second side plate 9. Alternatively, the pivot shaft 15 can be supported by the first side plate 8 in the manner of a cantilever, for example.

(f) In the aforementioned embodiment, the attachment portion 7a is formed unitarily with the second side cover 7. However, the attachment portion 7a and the second side cover 7 may be formed separately from each other. Moreover, although the surface of the attachment portion 7a on the second side plate 9 side is formed as an inclined surface while the fore end surface of the large diameter portion 15d of the pivot shaft 15 is perpendicular to the axis X of the pivot shaft 15 in the aforementioned embodiment. Alternatively, the surface of the attachment portion 7a on the second side plate 9 side can be formed perpendicular to the axis X of the pivot shaft 15, and the fore end surface of the large diameter portion 15d of the pivot shaft 15 can be formed as an inclined surface.

Figure 16:
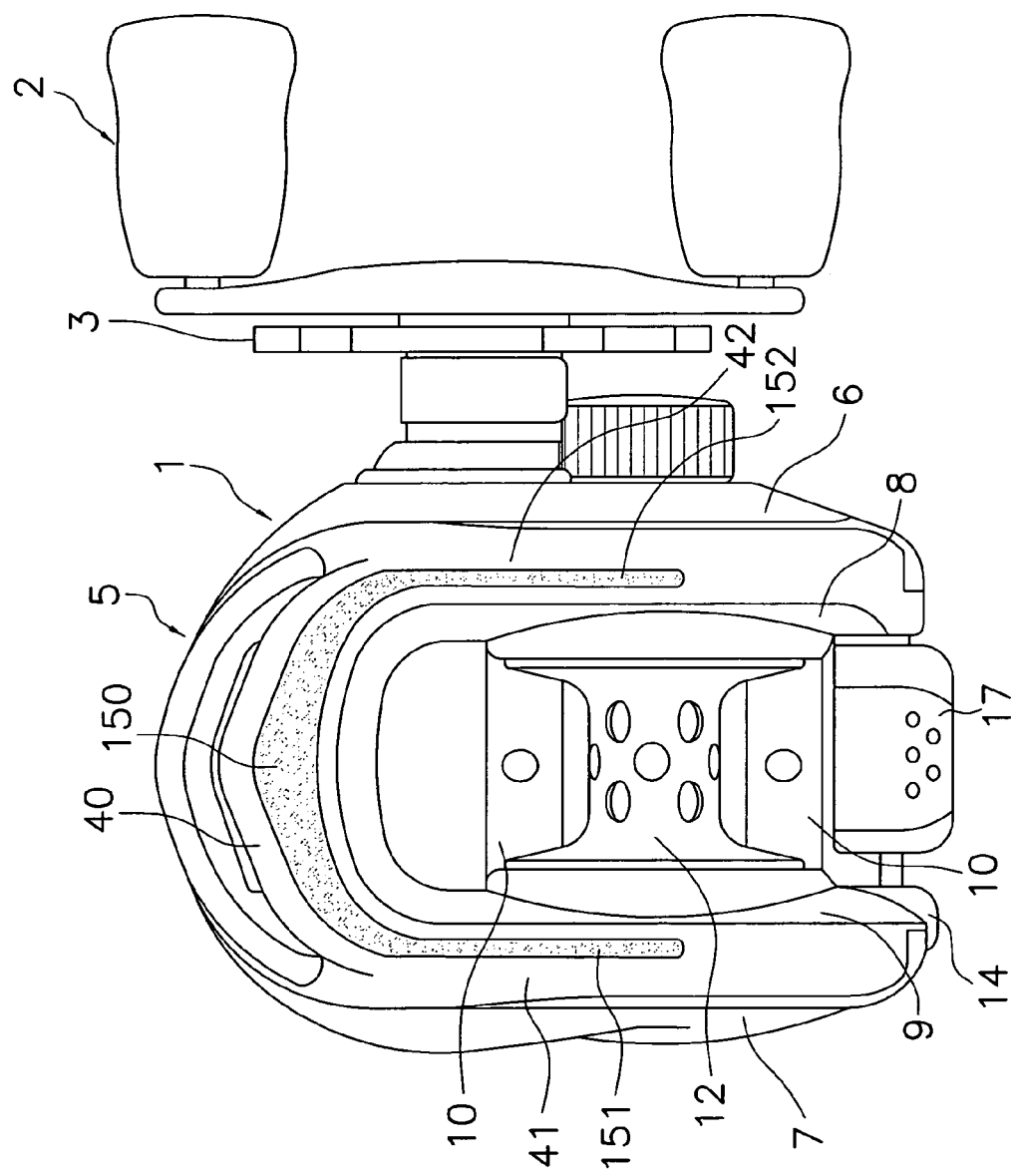
FIG. 16 is a plan view of a dual-bearing reel in accordance with another embodiment (g) of the present invention.

(g) In the aforementioned embodiment, the first guard member 50, the second guard member 51, and the third guard member 52 are disposed at the three separate locations of the upper parts of the front cover 40, the first top cover 41, and the second top cover 42. Alternatively, the first guard member 150, the second guard member 151, and the third guard member 152 may be unitarily formed in a substantially U-shape as shown in FIG. 16. Furthermore, the first guard member, the second guard member, and the third guard member can be formed in any desired shape as long as they are attached to least three locations that are likely to come into contact with the ground when the fishing rod is placed on the ground with the upper part of the reel facing downward, with the reel being attached to the fishing rod.

(h) In the aforementioned embodiment, when the operating lever 14 is positioned on the first position, the pin member 15a is misaligned relative to the through hole 114 as shown in FIG. 13, such that the second side cover 7 does not open automatically. In this manner, the second side cover 7 does not open even when the operating lever 114 is shifted from the second position to the first position by mistake. However, the present invention can be constructed such that the pin member 15a can be aligned with the through hole 114c of the operating lever 114 as shown in FIG. 17, which corresponds to FIG. 12, when the operating lever 114 is in the first position, such that the pin member 15a can pass through the through hole 114c with only the shifting of the operating lever 114.

Figure 20:
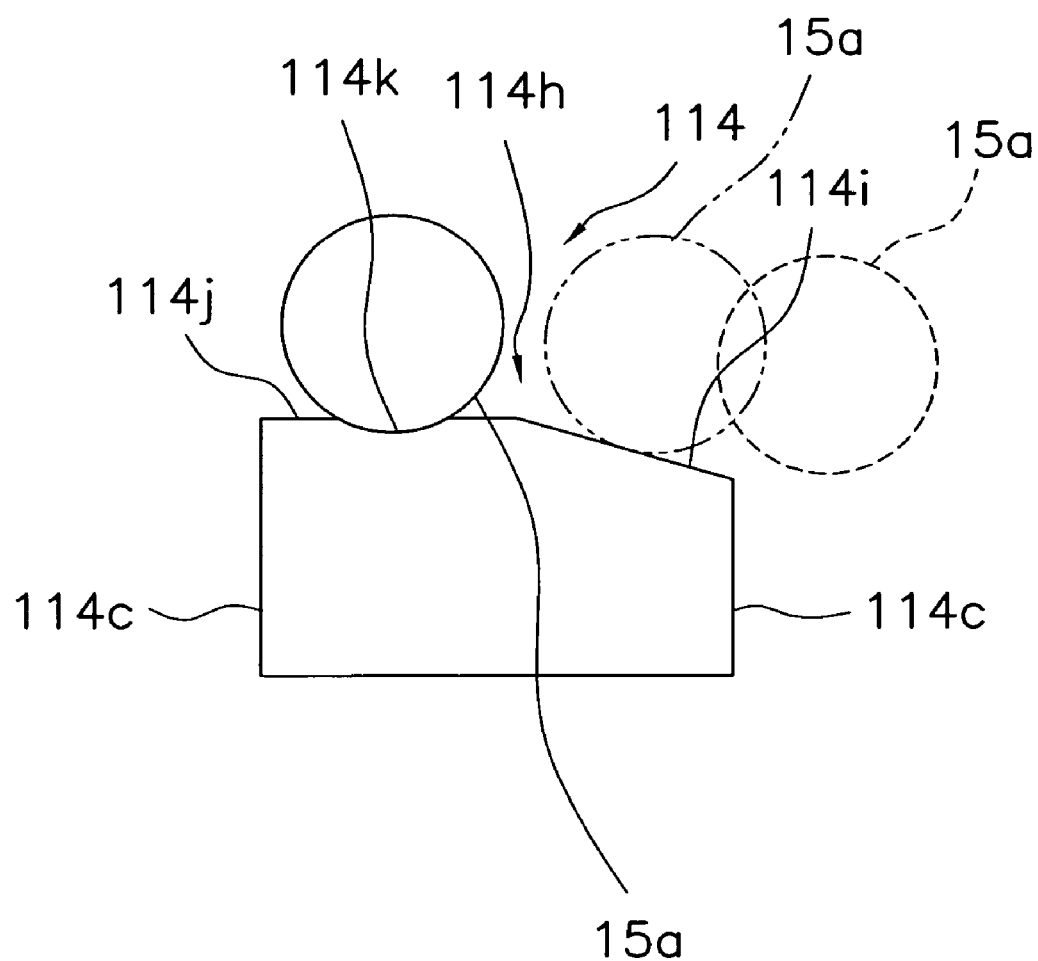
FIG. 20 is a schematic cross sectional view of the inclined surface of the lever member in accordance with the other embodiment (h) of the present invention as viewed along the line XX shown in FIG. 18, indicating the movement of the pin member as the operating lever moves.

In this embodiment, as shown in FIG. 20, the through hole 114c through which the pin member 15a can pass is formed to have fan-shaped ends on the second recessed portion 114e of the operating lever 114. Each of the inclined surfaces 114h includes an inclined portion 114j whose surface becomes heightened from the edge of the through hole 114c in a direction toward the left hand side direction as shown in FIG. 20 (counterclockwise direction as shown in FIG. 17), and a flat portion 114j whose surface is perpendicular to the axis of the pivot shaft 15. In a middle portion of the flat portion 114j, an engagement groove 114k is formed in an arc shape that partially conforms to the outer shape of the pin member 15a. The engagement groove 114k is formed such that the pin member 15a engages the engagement groove 114k when the operating lever 114 is positioned on the second position.

Figure 17:
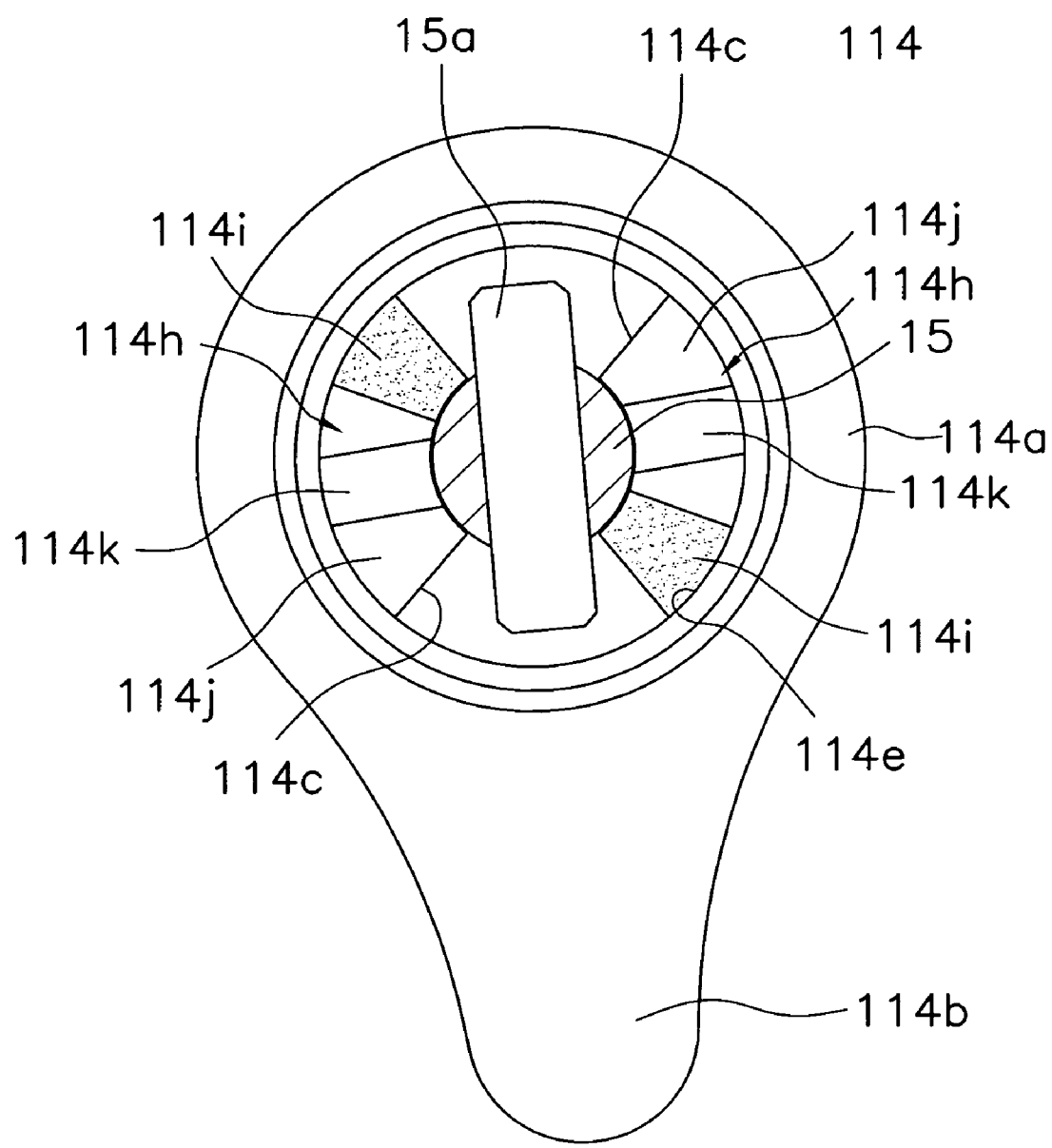
FIG. 17 is an enlarged side view of the lever member and the pin member in accordance with still another embodiment (h) of the present invention, when the second side cover is opened.
Figure 18:
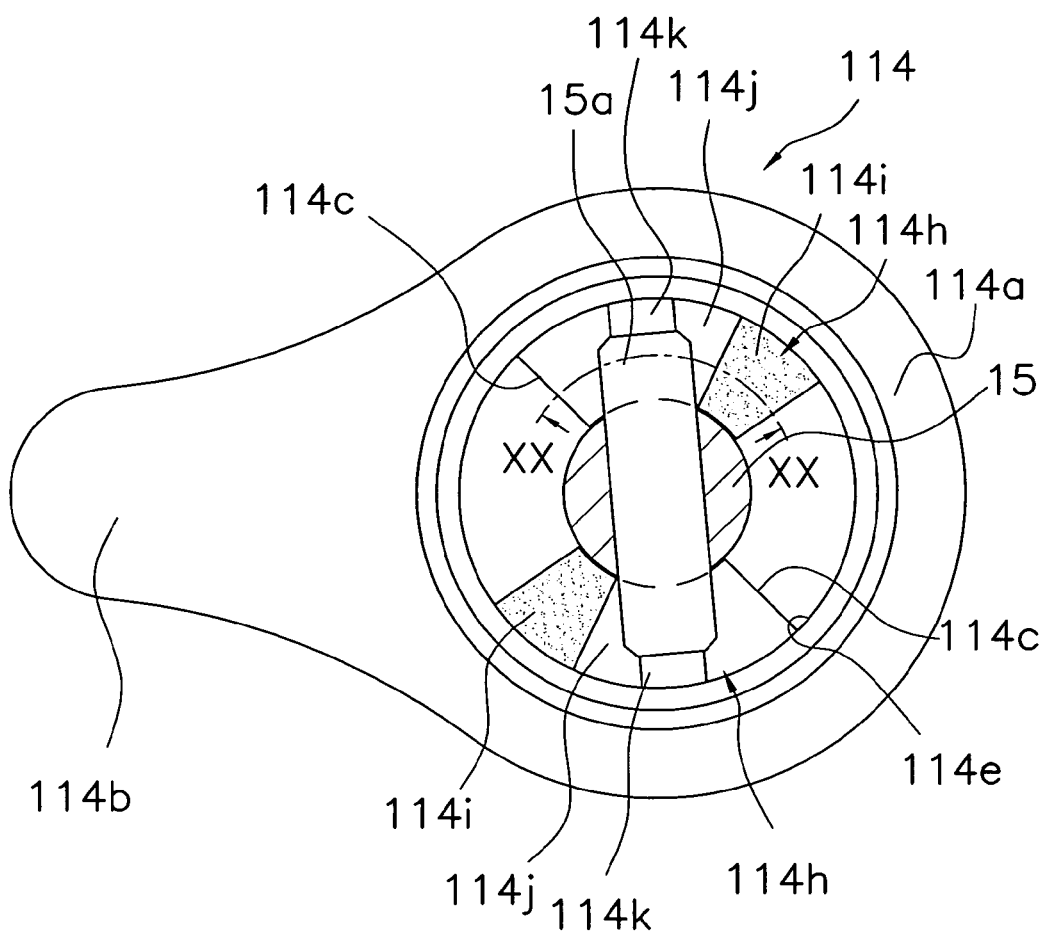
FIG. 18 is an enlarged side view of the lever member and the pin member in accordance with the other embodiment (h) of the present invention corresponding to FIG. 17, when the lever member is in the first position and the second side cover is closed.
Figure 19:
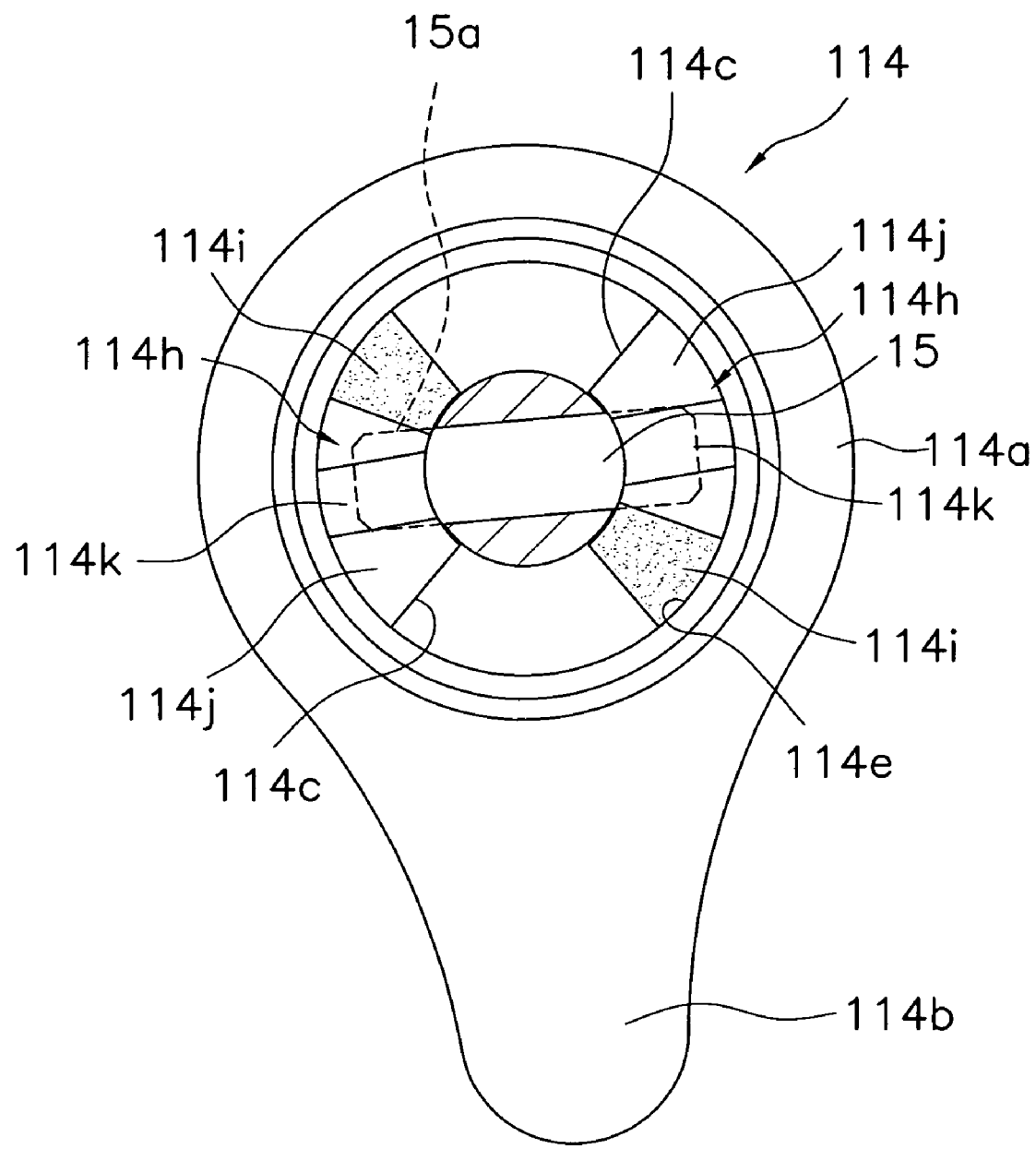
FIG. 19 is an enlarged side view of the lever member and the pin member in accordance with the other embodiment (h) of the present invention corresponding to FIG. 17, when the lever member is pivoted to the second position.

In this case, in order to open the second side cover 7, the operating lever 114 is shifted from the second position shown in FIG. 18 to the first position shown in FIG. 17. Accordingly, the pin member 15a of the pivot shaft 15 is positioned at a position where the pin member 15a can be passed through the through hole 114c. At this time, since the second side cover 7 and the pivot shaft 15 are biased toward the left hand side (as seen in FIG. 7) by the spring member 16, the second side cover 7 and the pivot shaft 15 move in the direction away from the first side cover 6 until the restriction member 15b shown in FIG. 5 abuts on the first side plate 8, such that the pin member 15a passes through the through hole 114c and is positioned on the second side cover 7 side of the first recessed portion 14d of the operating lever 114. Then, as shown in FIGS. 7 and 19, the second side cover 7 and the pivot shaft 15 pivot due to the weight of the second side cover 7. Accordingly, the second side cover 7 is opened.

In order to close the second side cover 7, the second side cover 7 is pivoted in the reverse direction, until the pin member 15a of the pivot shaft 15 reaches the position where the pin member 15a can pass through the through hole 114c (see FIGS. 7 and 17). Then, the second side cover 7 and the pivot shaft 15 are moved toward the right hand side as seen in FIG. 9 against the biasing force of the spring member 16, such that the pin member 15a passes through the through hole 114c and is positioned on the right hand side of the second recessed portion 114e. Then, the operating lever 114 is pivoted from the first position shown in FIG. 17 to the second position shown in FIG. 18, such that the inclined portion 114j of the inclined surfaces 114h come into contact with the pin member 15a. At this time, the second cover 7 and the pivot shaft 15 are biased toward the left hand side as seen in FIG. 7 by the spring member 16. The surfaces of the inclined portions 114i become heightened in the counter clockwise direction as seen in FIGS. 17–19. Thus, the operating lever 114 can maintain the second position due to the biasing force of the spring member 16 as well as the engagement of the pin member 15a with the engagement groove 114k formed in the middle of the flat portion 114j, thereby restricting pivoting movement of the operating lever 114. Therefore, the operating lever 114 is not likely to be moved from the second position inadvertently even when the user touches the operating lever 114 by mistake. At the same time, the second side cover 7 is pushed toward the second side plate 9.

By constructing the interlocking mechanism in this manner, it is possible to open the second side cover 7 easily by simply operating the operating lever 14' from the second position to the first position.

According to the present invention, the operating portion of the open/close mechanism that opens and closes the second side cover is provided so as to be exposed from the second side plate. Thus, the reel unit of the present invention allows easy opening and closing of the side cover. Moreover, the palm of user's hand does not touch the operating portion while gripping the reel unit during opening and closing of the second side cover. In addition, it is possible to make the size of the entire reel smaller, and additionally to achieve more attractive appearance.

According to another aspect of the present invention, in a dual-bearing reel that can open and close a second side plate relative to a second side cover, the second side cover is attached to the shaft member in an inclined manner such that the fore end side of the second side cover is closer to the second side plate. Therefore, a gap is less likely to be formed between the second side plate and the second side cover when the second side cover is closed.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Applications Nos. 2004-117788, 2004-144826, 2004-154246. The entire disclosure of Japanese Patent Applications Nos. 2004-117788, 2004-144826, 2004-154246 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A reel unit for a dual-bearing reel that is adapted to be mounted to a fishing rod, the reel having a handle disposed on one side surface of the reel unit and a spool that is adapted to reel out fishing line and is disposed inside the reel unit, the reel unit comprising:
    a frame that has first and second side plates between which the spool is disposed, and a connection member connecting the first and second side plates;
    a first side cover that is mounted to the first side plate, the handle being adapted to be mounted to the first side cover;
    a second side cover that is mounted to the second side plate so as to be opened and closed relative to the second side plate; and
    an operating portion that is provided on the second side plate without protruding from the second side plate in a direction toward the second side cover, the operation portion being designed to assume one of first and second positions, the second side cover being locked in a closed state when the operation portion assumes the second position, the operation portion allowing the second side cover to be opened and closed relative to the second side plate when the operation portion assumes the first position.

2. The reel unit for a dual-bearing reel set forth in claim 1, wherein
    the second side cover is mounted to the second side plate via a shaft portion, the second side cover being pivotable about a direction of the shaft portion and movable in the direction of the shaft portion relative to the second side plate.

3. The reel unit for a dual-bearing reel set forth in claim 1, further comprising
a rod mounting leg portion that is provided in the frame, the fishing rod being adapted to be attached to the rod mounting leg,
wherein a length between an upper surface of the frame and a bottom surface of the rod mounting leg portion is smaller than a length of the frame along a longitudinal direction of the fishing rod.

4. The reel unit for a dual-bearing reel set forth in claims 1, further comprising
guard members that are disposed to protrude upwardly from an upper surface of the frame, the guard members covering at least partially over each of the first and second side plates and the connection member of the frame, the amount of protrusion from the upper surface being within a range of not less than 0.1 mm and not more than 0.5 mm.

5. The reel unit for a dual-bearing reel set forth in claim 4, wherein
the amount of protrusion from the upper surface is within a range of not less than 0.2 mm and not more than 0.3 mm.

6. The reel unit for a dual-bearing reel set forth in claim 2, further comprising
an urging member that urges the second side cover in a direction to move the second side cover away from the second side plate.

7. The reel unit for a dual-bearing reel set forth in claim 6, wherein
the urging member urges the shaft portion in a direction toward the second side cover.

8. The reel unit for a dual-bearing reel set forth in claim 2, wherein
a first end of the second side cover is attached to a fore end of the shaft portion, and
the shaft portion is rotatable about and movable in the direction of the shaft portion relative to the second side plate, the shaft portion being substantially parallel to a rotational axis of the spool.

9. The reel unit for a dual-bearing reel set forth in claim 8, wherein
the second side cover is attached to the shaft portion in an inclined manner such that a second end of the second side cover is closer to the second side plate than the first end of the second side cover is.

10. The reel unit for a dual-bearing reel set forth in claim 9, wherein
a surface of the second side cover that is attached to the fore end of the shaft portion is not parallel with a surface of the fore end of the shaft portion.

11. The reel unit for a dual-bearing reel set forth in claim 2, wherein
a base end of the shaft portion is rotatable about and movable in the direction of the shaft portion relative to the first side plate.

12. The reel unit for a dual-bearing reel set forth in claim 2, further comprising
a restriction member that is provided in a base end of the shaft portion, the restricting member restricting an axial movement of the shaft portion.

13. The reel unit for a dual-bearing reel set forth in claim 12, wherein
the restricting member restricts the axial movement of the shaft portion by abutting on the first side plate.

14. The reel unit for a dual-bearing reel set forth in claim 2, wherein
the operating portion is a lever member that is coupled to the shaft portion so as to be pivotable between the first position and the second position around the shaft portion relative to the second side plate.

15. The reel unit for a dual-bearing reel set forth in claim 2, wherein
the shaft portion has a shaft part and a pin member that protrudes from the shaft part,
the operating portion has a through hole, the pin member being sized to pass through the through hole when the pin member is aligned with the through hole, and
the operating portion is in the first position when the pin member is aligned with the through hole.

16. The reel unit for a dual-bearing reel set forth in claim 15, wherein
the pin member becomes aligned with the through hole by pivoting the operation portion to the first position.

17. A dual bearing reel, comprising:
a handle;
a reel unit, including
a frame that has first and second side plates, and a connection member connecting the first and second side plates,
a first side cover that is mounted to the first side plate, the handle being adapted to be mounted to the first side cover,
a second side cover that is mounted to the second side plate so as to be opened and closed relative to the second side plate, and
an operating portion that is provided on the second side plate without protruding from the second side plate in a direction toward the second side cover, the operation portion being designed to assume one of first and second positions, the second side cover being locked in a closed state when the operation portion assumes the second position, the operation portion allowing the second side cover to be opened and closed relative to the second side plate when the operation portion assumes the first position; and
a spool that is adapted to reel out fishing line and is disposed inside the reel unit.

18. The dual-bearing reel set forth in claim 17, wherein
the second side cover is mounted to the second side plate via a shaft portion, the second side cover being pivotable about a direction of the shaft portion and movable in the direction of the shaft portion relative to the second side plate, a first end of the second side cover is attached to a fore end of a shaft portion, and
the shaft portion is rotatable about and movable in the direction of the shaft portion relative to the second side plate.

19. The dual-bearing reel set forth in claim 18, wherein
the second side cover is attached to the shaft portion in an inclined manner such that a second end of the second side cover is closer to the second side plate than the first end of the second side cover is.

20. The dual-bearing reel set forth in claim 18, wherein
the reel unit further includes guard members that are disposed to protrude upwardly from an upper surface of the frame, the guard members covering over the first and second side plates and the connection member of the frame, the amount of protrusion from the upper surface being within a range of not less than 0.1 mm and not more than 0.5 mm.

* * * * *